US011579911B1

(12) United States Patent
Santos et al.

(10) Patent No.: US 11,579,911 B1
(45) Date of Patent: Feb. 14, 2023

(54) EMULATED EDGE LOCATIONS IN CLOUD-BASED NETWORKS FOR TESTING AND MIGRATING VIRTUALIZED RESOURCES

(71) Applicant: Amazon Technologies, Inc., Seattle, WA (US)

(72) Inventors: John Edsel Santos, Belleuve, WA (US); Nikolay Krasilnikov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 446 days.

(21) Appl. No.: 16/781,812

(22) Filed: Feb. 4, 2020

(51) Int. Cl.

*G06F 9/455* (2018.01)
*G06F 9/50* (2006.01)
*G06F 11/36* (2006.01)
*G06F 8/60* (2018.01)

(52) U.S. Cl.

CPC ............ *G06F 9/45558* (2013.01); *G06F 8/60* (2013.01); *G06F 9/455* (2013.01); *G06F 9/5088* (2013.01); *G06F 11/3664* (2013.01); *G06F 2009/4557* (2013.01); *G06F 2009/45562* (2013.01); *G06F 2009/45595* (2013.01); *G06F 2212/151* (2013.01)

(58) Field of Classification Search

None

See application file for complete search history.

(56) References Cited

PUBLICATIONS

Coutinho et al., "Fogbed: A Rapid-Prototyping Emulation Environment for Fog Computing", 2018, IEEE. (Year: 2018).*

Hasenburg et al., "MockFog: Emulating Fog Computing Infrastructure in the Cloud", 2019, IEEE, pp. 144-152. (Year: 2019).*

* cited by examiner

*Primary Examiner* — Qing Yuan Wu

(74) *Attorney, Agent, or Firm* — Lee & Hayes, P.C.

(57) ABSTRACT

Various techniques for emulating edge locations in cloud-based networks are described. An example method includes generating an emulated edge location in a region. The emulated edge location can include one or more first computing resources in the region. A host in the region may launch a virtualized resource a portion of the one or more first computing resources. Output data that was output by the virtualized resource in response to input data can be received and reported to a user device, which may provide a request to migrate the virtualized resource to a non-emulated edge location. The non-emulated edge location may include one or more second computing resources that are connected to the region by an intermediary network. The virtualized resource can be migrated from the first computing resources to at least one second computing resource in the non-emulated edge location.

21 Claims, 15 Drawing Sheets

EMULATED EDGE LOCATIONS IN CLOUD-BASED NETWORKS FOR TESTING AND MIGRATING VIRTUALIZED RESOURCES

BACKGROUND

Various cloud-based networks can provide virtualized computing resources to various users. A cloud-based network may be arranged into multiple availability zones. An availability zone may include at least one data center comprising a fleet of hosts (e.g., devices, servers, or the like). Within the availability zone, hosts can be interconnected by one or more internal communication networks. In various implementations, the internal communication network(s) may be capable of performing high speed data transfer between devices in the fleet. Further, the internal communication network(s) may be isolated from public communication networks, such as the Internet. For instance, the internal communication network(s) may be protected from external data traffic by firewalls and other network security measures.

The hosts in the fleet may host various virtualized resources. In some cases, a virtualized resource may be a Virtualized Machine (VM) that utilizes various computing resources of the hosts in the fleet. For instance, an example VM may utilize a processor of an example host to perform various operations. In some cases, the example VM may store data in memory of the example host.

Various virtualized resources, managed by a variety of different users, may occupy the hosts in the availability zone. The virtualized resources can be controlled by users from devices outside of the availability zone in which the virtualized resources are hosted. The users can therefore utilize various computing resources of the fleet of hosts even while being located remotely from the fleet.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
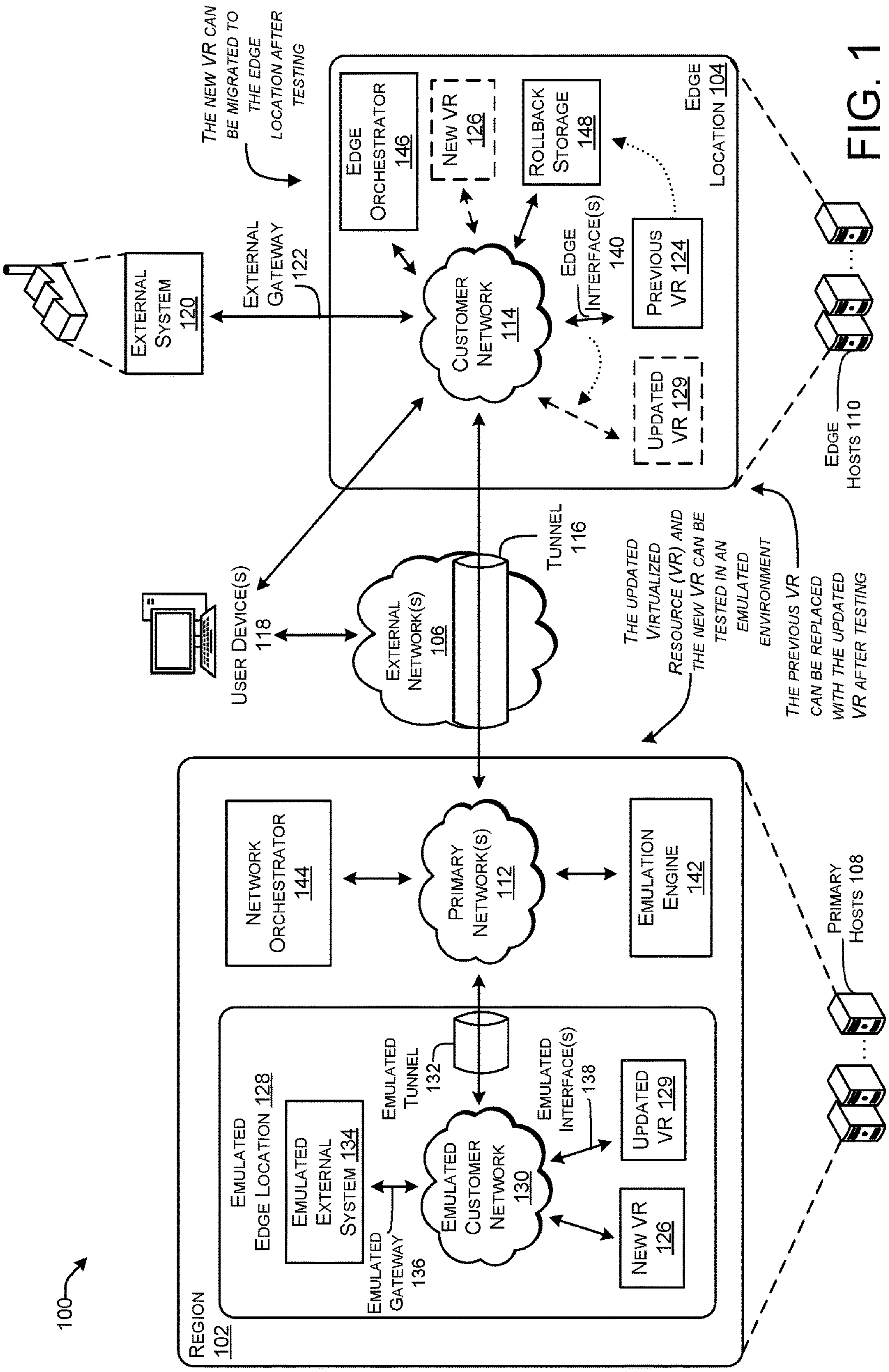
FIG. 1 illustrates an example environment for testing and/or migrating virtualized resources.

This disclosure describes systems, devices, and techniques for developing and testing virtualized resources in an emulated edge location and transferring tested virtualized resources to a non-emulated edge location. In some cases, virtualized resources can be migrated to or from non-emulated edge locations.

In various implementations, an organization may establish an on-premise edge location of a cloud provider network, the edge location including one or more servers connected to the cloud provider network by a secure communication network. The organization may host various services, applications, and other virtualized resources in the on-premise edge location, for various reasons. For example, the organization may be using the virtualized resources to provide services and/or applications to on-premise systems with stringent latency requirements. By hosting the virtualized resources in an on-premise edge location, the virtualized resources may be geographically closer to these on-premise systems than if they were hosted in an off-premise service provider network (e.g., the remote cloud network). In other implementations, the edge location may be incorporated into another communications network, for example a telecommunications network, in order to provide low latency communications to end users of the telecommunications network. Accordingly, the edge location can support low latency communications between the virtualized resources and the external systems. Some examples of latency-sensitive systems include automated factories, drone control systems, smart city architecture (e.g., automated traffic lights, etc.), mobile applications such as AR/VR and gaming, or the like.

In some cases, the organization may develop (e.g., create and/or update) the configuration for their virtualized resources. In an automated factory example, the organization may add a new service that controls a new piece of automated equipment in the factory. In a mobile gaming example, the organization may create a game server to manage gameplay for a number of mobile device users. In some cases, the organization may identify that an existing service is operating in an unsatisfactory and/or suboptimal manner and may seek to debug and/or update the existing service.

However, developing virtualized resources in computing resources of the edge location may be difficult and may introduce significant problems to the organization. For instance, the edge location may have a limited amount of computing resources in comparison to the larger cloud provider network and may be unable to devote computing resources to the testing and development of the virtualized resource configuration without interrupting ongoing services that require the capacity in the edge location. As another example, developing virtualized resource configuration may be an iterative debugging process by which the virtualized resources experience malfunctions and are modified by developers to prevent future malfunctions. However, when the virtualized resources are used in conjunction with sensitive external systems, those malfunctions may cause the external systems to malfunction in an unacceptable manner. For example, if a virtualized resource is used to control a steel-cutting robot in an automated factory, a malfunction of the virtualized resource may cause the steel-cutting robot to malfunction, potentially interrupting the manufacturing process and wasting resources.

In various implementations described herein, these and other problems are addressed by emulating edge locations in a region of the cloud provider network, for example a region that hosts a control plane that controls the edge location. The region may more easily accommodate the capacity required for development and testing, and may accurately recreate the edge location by emulating the edge location network configuration (e.g., VPC), local gateways to on-prem network(s), and on-prem devices that talk to the edge location through the on-prem network(s). This emulation of edge location configuration in a region is referred to herein as an emulated edge location. Accordingly, the emulated edge locations may allow development and testing of applications specifically for the edge location configuration, while beneficially refraining from using the limited computing resources of the edge location itself.

An emulated edge location may be substantially similar to an existing non-emulated edge location. For example, an edge location may be contained within its own virtual private cloud ("VPC"). A VPC is a custom-defined, virtual network within a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC), and transit paths. The emulated edge location may mirror the configuration of this VPC network with a size (e.g., a capacity) and a network configuration that is similar to the size and network configuration of the actual edge location. Resource hosts within the region can be selected for inclusion in the emulated edge location based on having the same (or substantially similar) resource capabilities (e.g., processing, memory, storage, and network) to the hosts within the real edge location. Due to being dedicated to a single customer, these hosts in the edge location and the corresponding hosts selected in the region can be referred to as dedicated hosts, dedicated virtual servers, sole-tenant nodes, or dedicated virtual machine hosts, in various implementations. These physical hosts selected for the emulated edge location may be virtualized to include various virtual nodes (e.g., virtualized resources, virtualized switches, or the like) and various virtual interfaces that match nodes and interfaces in the actual edge location. For instance, a virtual interface can be generated based on an interface in the non-emulated edge location, wherein the virtual interface may enforce a latency on transmitted data packets that matches a measured latency of data packets transmitted over the interface in the non-emulated edge location. Any security policies enforced in the non-emulated edge location can be copied into the emulated edge location. Any local gateways that enable the edge location to connect to on-premise networks can be emulated in the emulated edge location as well. In some cases, the external system(s) that communicate with the edge location through the on-prem network can be emulated in the emulated edge location, along with the gateway interface that connects the edge location to the external system. Accordingly, the emulated edge location can process, transmit, or otherwise accommodate data similarly to the non-emulated edge location.

The emulated edge location can be used to develop virtualized resources, such as services and/or applications, which may be later deployed in the non-emulated edge location. In some cases, a virtualized resource can be built from scratch in the emulated edge location. In some implementations, a virtualized resource can be copied and migrated from the non-emulated edge location. According to various implementations, the virtualized resource can be modified in the non-emulated edge location during development. A user associated with the organization, such as a developer, may create, copy, and/or change the virtualized resource remotely, e.g., using an Application Programming Interface (API) provided by the region.

In some implementations, a virtualized resource can be tested in the emulated edge location. For example, input data can be input into the virtualized resource to generate output data. The output data may be forwarded to at least one user of the organization, such as the developer, who may determine whether the output data is expected and/or correct. In some cases, the output data may be automatically compared to prespecified output data in order to determine whether the virtualized resource is operating acceptably in the emulated edge location. The input data may be predetermined. For example, the developer may specify the input data in advance of testing the virtualized resource. In some cases, the input data may be reported from the non-emulated edge location. For example, a component in the non-emulated edge location may copy (e.g., using a sniffer, traffic mirroring service, or the like) data input to a virtualized resource in the non-emulated edge location and transmit the copied data to the emulated edge location, and the data can be used as input data to test the virtualized resource under development in the emulated edge location. In various implementations, the results of testing the virtualized resource (e.g., the output data, how the output data compares to the prespecified output data, whether the virtualized resource crashed during testing, or the like) can be reported to the developer.

In various implementations, the emulated edge location can be configured to expand or contract its available capacity during the development of a virtualized resource. This may be in contrast to a non-emulated edge location, which may be limited to a fixed amount of capacity provided by the limited computing resources in the non-emulated edge location. In some cases, the amount of capacity in the region used to accommodate the virtualized resource and/or other components in the emulated edge location can be monitored as the virtualized resource is developed. The amount of capacity can be reported to a user associated with the organization, such as the developer. In some implementations, the amount of capacity used to accommodate the virtualized resource during development can be used to select and/or modify a capacity of the edge location. For example, the organization may order a preconfigured edge location with at least the amount of capacity used to accommodate the virtualized resource during testing. In some cases, the organization can order additional computing resources to add to an existing non-emulated edge location to accommodate the virtualized resource.

According to various examples, the virtualized resource can be migrated from the emulated edge location to the non-emulated edge location, so that the virtualized resource can be launched in the non-emulated edge location. The virtualized resource may be migrated in response to a request by a user associated with the organization (e.g., a developer or an administrator of the organization). In various examples, the operations of the virtualized resource can be suspended during migration. For example, the migration can be performed as the virtualized resource is being rebooted. In some cases, a virtualized resource may be migrated between two edge locations connected to a region using similar strategies. In various implementations, migration of multiple virtualized resources from a source host to a destination host can be performed simultaneously.

In some cases in which an updated virtualized resource is migrated to the non-emulated edge location to replace an outdated or previous virtualized resources, various measures can be taken to rollback the migration if the updated virtualized resource is migrated unsuccessfully. The outdated virtualized resource may be hibernated and removed from a slot into the non-emulated edge location to prepare for the updated virtualized resource to be migrated into the slot. For example, data associated with the functionality and/or state of the outdated virtualized resource can be stored in a datastore within the non-emulated edge location. The data may include, for example, any combination of state data of the virtualized resource, data encoding instructions for operations of the virtualized resource, data stored in a block storage volume associated with the virtualized resource, local storage of the virtualized resource, or the like. If the updated virtualized resource is successfully migrated into the slot, the data associated with the outdated virtualized resource can be deleted from the datastore. However, if the updated virtualized resource is unsuccessfully migrated into the slot (e.g., a secure communication tunnel between the region and the non-emulated edge location is interrupted during migration), the data associated with the outdated virtualized resource can be extracted from the datastore and used to relaunch the outdated virtualized resource in the non-emulated edge location. Accordingly, the non-emulated edge location can continue to function as before, even if the updated virtualized resource fails to reach the non-emulated edge location.

Various implementations described herein provide specific improvements to the technological field of network-based computing. For example, various examples of the emulated edge location described herein enables safe and efficient development and testing of virtualized resources before they are launched in a real-world-impacting environment. Thus, examples disclosed herein can be used to more efficiently update virtualized resources in an edge location than previous technologies. Various examples described herein enable an organization to plan and/or obtain computing resources in an edge location that will accommodate a virtualized resource in development, which can prevent the virtualized resource or the edge location from failing when the virtualized resource is deployed in the edge location. Further, an outdated virtualized resource in an edge location can be replaced with an updated virtualized resource using migration, and if there are any problems with the migration, the outdated virtualized resource can be efficiently reestablished in the edge location in order to maintain functionality of the edge location. These and other computer problems specific to computer networks are addressed by implementations of the present disclosure. Examples described herein can be applied to real-world networked environments, which may include a region and/or one or more edge locations connected to the region.

Various implementations will now be described with reference to the accompanying figures.

FIG. 1 illustrates an example environment 100 for testing and/or migrating virtualized resources. This environment 100 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

A region 102 may be connected to an edge location 104 via one or more external networks 106. The edge location 104 may receive control plane services from one or more availability zones in the region 102. Further details of example cloud-provider networks, including the structure of regions, availability zones, and data centers, will be described below with reference to at least FIGS. 10, 11, 13, and 14.

As used herein, the terms "edge location," "edge region," "provider substrate extension," and their equivalents can refer to a collection of one or more hosts that provide at least some of the functionality of the virtualized services of the cloud provider network, but are separated from the cloud provider network by at least one network (e.g., a Virtual Private Network (VPN) or other secure connection over a public network such as the Internet, or in some scenarios via a direct connection such as a private fiber network). In various cases, the edge location may be geographically separated from the cloud provider network, as described in further detail below. The edge location may not have the full functionality of a typical cloud provider availability zone, for example it may extend data plane functionality of the cloud provider network while relying on control plane functionality from a nearby availability zone of the cloud provider network. Further details of example edge locations will be described below with reference to at least FIG. 13.

The external network(s) 106 may include at least one public network. As *used* herein, the term "public network" can refer to any data communication network that can be used to convey the transmission of data between unverified entities. Accordingly, data transmitted over the public network may be vulnerable to interception and/or attacks by nefarious entities connected to the public network. Some examples of a public network include a Wide Area Network (WAN), such as the Internet, a mobile core network (e.g., a $3^{rd}$ Generation (3G) core network, an Evolved Packet Core (EPC), a $5^{th}$ Generation (5G) core network, etc.), a Radio Access Network (RAN), or the like.

Various regions within the environment 100 can include multiple hosts. As used herein, the term "host," and its equivalents, can refer to one or more physical devices (e.g., one or more physical servers) configured to provide computing resources. The hosts within the environment may be configured to accommodate virtualized resources within their respective computing resources. As used herein, the term "virtualized resource" can refer to software and/or data that can be hosted by a host device, such as a server. Examples of virtualized resources include, for instance, Virtual Machines (VMs), software instances, services, applications, or the like. In various examples, a single virtualized resource may be associated with a single user or entity (e.g., a corporation, a business, a government agency, a non-profit, other type of organization, etc.), a single user or organizational account, or group of users or entities. For the purposes of this discussion, the terms "user" and "entity" can be used interchangeably throughout this disclosure. In some cases, a virtualized resource can be hosted by multiple physical servers, simultaneously. In some cases, a host can be a "shared server," which may be a single physical server configured to run multiple virtualized resources, simultaneously. In some cases, a host can be a "bare-metal server," which may be a single physical server configured to run a single virtualized resource at a particular time. Examples of hosts will be described below with reference to FIG. 11. Referring to FIG. 1, the region 102 may include multiple primary hosts 108 and the edge location 104 may include multiple edge hosts 110.

Each of the hosts 108 and 110 in the environment 100 may include various computing resources that can host virtualized resources. As used herein, the terms "computing resource," "compute resources," "resources," and their equivalents, can refer to at least one of processing resources, memory resources, cache resources, service resources, or the like, of one or more hosts. The term "processing resource," and its equivalents, may refer to the availability of at least a portion of one or more physical processors (e.g., Central Processing Units (CPUs)) to process data. The terms "memory resource," "storage resource, and their equivalents, may refer to the availability of at least a portion of one or more physical memory systems (e.g., Random Access Memory (RAM)) to store data. The term "cache resource," and its equivalents, can refer to the availability of a capacity in a RAM and/or in-memory engine to cache data at least temporarily. The term "service resource," and its equivalents, may refer to the availability of one or more services hosted by a physical server to perform requested operations. In various implementations described herein, the term "capacity" can refer to an amount of one or more resources in a host and/or communication network (e.g., a communication tunnel). For instance, a capacity of a processing resource can be in units of Gigahertz (GHz), a capacity of a memory resource can be in units of Megabytes (MB), Gigabytes (GB), or the like. In some multitenancy examples, a first capacity of a resource (e.g., a memory resource) may be allocated to a first virtualized resource and a second capacity of the resource may be allocated to a second virtualized resource, wherein a total capacity of the resource may be at least as large as a combination (e.g., a sum) of the first capacity and the second capacity. The term "available capacity," and its equivalents, may refer to an amount of unused or available resources within a particular host or communication network.

Each of the regions 102 and 104 in the environment may have at least one respective internal communication network by which data can be securely and rapidly transferred between various hosts and/or virtualized resources within the respective region 102 or 104. For example, the region 102 may include at least one primary network 112 and the edge location 104 may include a customer network 114. Although the primary network(s) 112 and the customer network 114 may be connected to the external network(s) 106, the primary network(s) 112 may enforce one or more first security policies on data transmitted between the primary network(s) 112 and the external network(s) 106, and the customer network 114 may enforce one or more second security policies on data transmitted between the customer network 114 and the external network(s) 106. For example, the primary network(s) 112 may include a first firewall that intercepts data traffic between the primary network(s) 112 and the external network(s) 106, and the customer network 114 may include a second firewall that intercepts data traffic between the customer network 114 and the external network(s) 106. Accordingly, the primary network(s) 112 and the customer network 114 may be secured from malicious traffic originating via a public network within the external network(s) 106. In some cases, at least one of primary network(s) 112 or the customer network 114 may include an optical fiber network configured to provide high-speed data communication between various entities (e.g., hosts, virtualized resources, devices, routers, switches, and the like) within their respective regions.

According to various implementations, the region 102 and the edge location 104 may communicate by exchanging data traffic over the external network(s) 106 via a secure tunnel 116. The tunnel 116 may be specifically designated for communications (e.g., data plane traffic and/or control plane traffic) between the region 102 and the edge location 104. In some cases, communications through the tunnel 116 may be encoded prior to transfer through the external network(s) 106. For example, the communications can be encoded via a key-based encoding method, such as symmetric key encryption, public key encryption, handshake encryption, Rivest-Shamir-Adleman (RSA) encryption, or the like. In some cases, the key can be at least 256 bits long. In some cases, the communications can be encoded via a Secure Hash Algorithm (SHA). According to some implementations, the tunnel 116 can include a reserved data tunnel, through which data traffic (e.g., virtualized resource data) can be transferred, and a reserved control tunnel, through which control plane data can be transferred. According to some examples, the tunnel 116 may include at least one VPN that provides a secure connection over the external network(s) 106. For instance, the tunnel 116 can utilize and/or include a Secure Socket Tunneling Protocol (SSTP), a virtual Local Area Network (LAN), a Virtual Private LAN Service (VPLS), a Pseudo Wire (PW), or the like. In various implementations, communications (e.g., virtualized resource data, control plane data, or the like) may be encoded at one endpoint of the tunnel 116, transmitted through the external network(s) 106 in accordance with the tunneling protocol, and may be decoded at another endpoint of the tunnel 116. For instance, the communications can be encoded by a source host and may be decoded by a target host. In some cases, an entity (e.g., a software instance hosted by at least one server) in a source data center may intercept communications flagged for transmission over the tunnel 116, may encode the communications before they are transmitted over the external network(s) 106.

One or more user devices 118 can connect to the external network(s) 106. In various examples, the user device(s) 118 may enable end users to control virtualized resources occupying various hosts within the environment 100. For instance, a user, entity, enterprise, or the like may be associated with an account for controlling and/or managing various virtualized resources in the environment 100. In various cases, the user device(s) 118 may be connected directly to the customer network 114. For example, the user device(s) 118 may include at least one device by which an administrator or other trusted user can control various virtualized resources and/or hosts within the edge location 104. The user device(s) 118 may include at least one device configured to receive and process input data from a user and/or to process and provide output data to the user. For example, the user device(s) 118 can include at least one of a laptop computer, a desktop computer, a tablet computer, a user equipment, a mobile device, a mobile phone, a personal digital assistant, a smart device, or the like.

An external system 120 may be further connected to the customer network 114 via an external gateway 122. The external system 120 may include one or more electronic devices. In some cases, the devices within the external system 120 may be latency-sensitive. For example, the external system 120 may include a network of latency-sensitive Internet of Things (IoT) devices, such as a smart grid network, an automated factory, a drone network, or the like. In various implementations, the external system 120 may be at least partially controlled by a virtualized resource. To accommodate the latency sensitivity of the external system 120, the virtualized resource may be located in the edge location 104, which may be geographically proximate to the external system 120. For example, a previous virtualized resource 124 may be configured to control and/or manage the external system 120 via data packets transmitted over the external gateway 122. Although the previous virtualized resource 124 is depicted in FIG. 1 as being separated from the external system 120 by the customer network 114, in some implementations, the previous virtualized resource 124 may be directly connected to the external gateway 122. The external gateway 122 may include at least one communication interface configured to accommodate low-latency communication, such as at least one optical fiber, an Ultra Reliable Low Latency Communications (URLLC) bearer, such as an URLLC radio and/or network bearer as defined by the 3$^{rd}$ Generation Partnership Project (3GPP).

In various example, it may be advantageous to build a new virtualized resource 126 that can be used to communicate with the external system 120 from the edge location 104. In some cases, it may be advantageous to modify the existing previous virtualized resource 124 in the edge location 104. However, due to limited capacity in the edge location 104, it may be difficult to build and test the new virtualized resource 126 in the edge location itself 104. Furthermore, live-updating and testing the previous virtualized resource 124 in the edge location 104 could disrupt the operations of the external system 120, and may therefore cause significant problems, particularly if the ongoing operations of the external system 120 are important and/or disrupting the ongoing operations of the external system 120 could be potentially dangerous.

According to various implementations of the present disclosure, the new virtualized resource 124 and/or an updated virtualized resource 126 can be tested in an emulated edge location 128, which may be accommodated by the region 102. The emulated edge location 128 may include a VPC within the region 102 with a particular subnet that is modeled after the edge location 104. For example, the emulated edge location 128 may include an emulated customer network 130 with similar characteristics (e.g., connectivity, latency, or the like) to the customer network 114 in the edge location. In various examples, the emulated customer network 130 may include a VPN that transmits data similarly to any virtual and/or physical networks within the customer network 114.

The emulated edge location 128 may include an emulated tunnel 132 that connects the primary network(s) 112 and the emulated customer network 130, which may be modeled after the tunnel 116 that connects the edge location and the primary network(s) 112. The emulated tunnel 132 may include a virtual interface within the region 102 that connects the emulated edge location 128 to the primary network(s) 112. In various examples, the emulated tunnel 132 can enforce a latency that is equivalent to a measured and/or expected latency over the tunnel 116. Accordingly, any communications (e.g., control plane communications) between the edge location 104 and the region 102 over the tunnel 116 can be accurately modeled in communications between the emulated edge location 128 and the primary network(s) 112 by the emulated tunnel 132.

The emulated edge location 128 may include an emulated external system 134 based on the external system 120, as well as an emulated gateway 136 that connects the emulated external system 134 and the emulated customer network 130. In various implementations, the emulated external system 134 may be a virtualized resource, such as a VM, that exchanges data with the emulated customer network 130 similarly to the manner in which the external system 120 exchanges data with the customer network 114 in the edge location. For example, if the external system 120 transmits feedback data to the customer network 114 during operation, the emulated external system 134 may be configured to transmit emulated feedback data to the emulated customer network 130, wherein the emulated feedback data is copied and/or modeled from the feedback data. Accordingly, the emulated external system 134 may be an accurate model of the external system 120. The emulated gateway 136 may include a virtual interface that enforces a latency that is equivalent to a measured and/or expected latency over the external gateway 122. Accordingly, any communications between the external system 120 and the edge location 104 can be accurately modeled in communications between the emulated external system 134 and the rest of the emulated edge location 128 using the emulated gateway 136.

According to various implementations, the emulated edge location 128 may have a network configuration that is the same, or at least similar, to a network configuration of the edge location 104. As used herein, the term "network configuration," and its equivalents, can refer to at least one of the overall connectivity of a network, identifications of nodes within the network, communication protocols utilized by the network, security policies and/or protocols utilized by the network, or any other characteristic of the network that impacts how data is transferred and/or processed through the network. For example, a network configuration can refer to the connectivity of various nodes (e.g., virtual and/or physical devices, ports, or the like) and/or interfaces (e.g., virtual and/or physical interfaces) within the network. For instance, a network configuration can include a routing map indicating the interconnectivity of various nodes and/or interfaces within the network. In some examples, a network configuration can indicate the identities (e.g., Internet Protocol (IP) addresses, Media Access Control (MAC) addresses, etc.) of various nodes within the network. According to some implementations, a network configuration can indicate one or more communication protocols (e.g., IP, User Datagram Protocol (UDP), etc.) by which data is transmitted through the network. According to some examples, a network configuration can specify one or more security and/or cryptographic protocols (e.g., Secure Hypertext Transfer Protocol (HTTPS), Secure File Transfer Protocol (SFTP), VPNs, etc.) utilized by communications through the network. By having a network configuration that is at least similar to the network configuration of the edge location 104, the emulated edge location 128 can have a similar network architecture to the edge location 104.

In various examples, the updated virtualized resource 129 may be connected to the rest of the emulated edge location 128 similarly to the manner in which the previous virtualized resource 124 is connected to the edge location 104. For example, the emulated edge location 128 may include at least one emulated interface 138 connecting the updated virtualized resource 129 to the emulated customer network 130 similarly to the manner in which at least one edge interface 140 connects the previous virtualized resource 124 to the customer network 114. The emulated interface(s) 138 may include at least one virtualized interface that is modeled after the edge interface(s) 140, which may include physical and/or virtual network interfaces within the edge location 104. For example, the emulated interface(s) 138 may enforce at least one communication latency that is equivalent to a measured and/or expected communication latency over the edge interface(s) 140.

According to various implementations, the emulated edge location 128 can be established by an emulation engine 142 in the region 102, a network orchestrator 144 in the region 102, and/or an edge orchestrator 146 in the edge location 104. At least one of the emulation engine 142, the network orchestrator 144, or the edge orchestrator 146 may include one or more virtualized resources, such as one or more VMs. In some examples, at least one user of the user device(s) 118 may request the creation of the emulated edge location 128 by causing the user device(s) 118 to transmit a request to the emulation engine 142 in the region 102. In various cases, the emulation engine 142 may include an Application Programming Interface (API) by which the user(s) can generate, manage, and/or control the emulated edge location 128 via the user device(s) 116.

According to various implementations, the network orchestrator 144 may track and manage various computing resources and/or virtualized resources within the region 102 and the edge location 104. The network orchestrator 144 may track which computing resources within the region 102 and the edge location 104 are actively hosting virtualized resources, as well as which computing resources within the region 102 and the edge location 104 are unoccupied by virtualized resources. In some cases, the network orchestrator 144 may further track the type of computing resources within the region and the edge location 104. For instance, the network orchestrator 144 may track memory capacity, processing capacity, and cache capacity of the various computing resources, as well as the operating systems, vendors, versions, or other features of the hosts including the various computing resources. In various implementations, the network orchestrator 144 may track the computing resources, virtualized resources, and hosts of the region 102 and the edge location 104 via control plane signaling throughout the region 102 and/or the edge location 104. According to some examples, the network orchestrator 144 may further orchestrate migration of virtualized resources between slots and/or hosts within the region 102 and/or the edge location 104. For example, the network orchestrator 144 may signal a source host to transmit data associated with a virtualized resource to a destination host that includes an unoccupied slot available for the virtualized resource.

The emulation engine 142 may identify the specifications (e.g., the network configuration) of the edge location 104 by receiving communications from the edge orchestrator 146. In some cases, the edge orchestrator 146 may monitor the functionality of various nodes and/or interfaces within the edge location 104. For example, the edge orchestrator 146 may measure a latency across an interface (e.g., the tunnel 116, the external gateway 122, the edge interface(s) 140, or the like) in the edge location 104 by transmitting an echo request message across the interface to a node (e.g., a node in the region 102, the external system 120, the previous virtualized resource 124, or the like), receiving an echo response message from the node across the interface, and calculating a one-way time across the interface based on the delay between the transmission time of the echo request and the reception time of the echo response. The edge orchestrator 146 may report any measured latencies associated with the edge location 104 to the emulation region 142. In various cases, the edge orchestrator 146 may monitor resource utilization in the edge location 104. For example, the edge orchestrator 146 may report the type and magnitude of utilized and/or unused capacity within the edge location 104. In some cases, the edge orchestrator 146 may copy data input into and/or output from any of the nodes in the edge location 104 or the external system 120. For instance, the edge orchestrator 146 may intercept and/or mirror data input and/or output from the previous virtualized resource 124, data input and/or output from the external system 120, or the like. In various implementations, the edge orchestrator 146 can report the characteristics of the edge location 104 to the emulation engine 142. Accordingly, the emulation engine may identify the characteristics of the emulated edge location 128. Although not specifically illustrated in FIG. 1, in some cases, the edge orchestrator 146, and any associated interfaces attached to the edge orchestrator within the edge location 104, may be emulated within the emulated edge location 128.

In some implementations, the emulation engine 142 may request the network orchestrator 144 to allocate a portion of computing resources within the region 102 to a VPC that can serve as the emulated edge location 128. The network orchestrator 144 may be an entity responsible for tracking and/or managing computing resources and virtualized resources within the region and the edge location 104. The network orchestrator 144 may allocate a portion of the computing resources within the region 102 for the emulated edge location. The portion may have the same or a similar capacity to the edge location 104 itself. In some cases, the portion may be located in physical devices within the same data center, the same rack(s) within the data center, or the like, to more accurately model the edge location 104. In some examples, the portion may include physical devices that have the same functionality (e.g., the same model or type) as the physical devices within the edge location 104. The network orchestrator 144 may confirm, to the emulation engine 142 that the portion has been allocated to the emulated edge location 128. Accordingly, the emulation engine 142 may create the various virtualized resources and/or interfaces within the emulated edge location 128.

In various instances, the emulation engine 142 may generate the new virtualized resource 126 and/or the updated virtualized resource 129 within the emulated edge location 128 based on input from the user device(s) 118. For example, the emulation engine 142 may provide a user interface to the user device(s) 118 by which the user(s) of the user device(s) 118 can build or otherwise specify the functionality of the new virtualized resource 126 and/or the updated virtualized resource 129 in the emulated edge location 128. Thus, the emulation engine 142 can provide a development platform for generating the new virtualized resource 126 and/or the updated virtualized resource 129 within the emulated edge location 128.

In some examples, the updated virtualized resource 129 may be based on the previous virtualized resource 124. Accordingly, the updated virtualized resource 129 may be initially generated in by copying the previous virtualized resource 124. The user(s) of the user device(s) 118 may request that the previous virtualized resource 124 be copied into the emulated edge location 128 for further development. In response to identifying the request, the emulation engine 142 may request the edge orchestrator 146 to copy data associated with the previous virtualized resource 124, such as any combination of state data of the previous virtualized resource 124, data encoding instructions for operations of the previous virtualized resource 124, data stored in a block storage volume associated with the previous virtualized resource 124, local storage of the previous virtualized resource 124, or the like. The edge orchestrator 146 may transmit the copied data to the emulated region 128. The data copied from the previous virtualized resource 124 may enable the copy of the previous virtualized resource 124 to launch in the emulated edge location 128 as the updated virtualized resource 129.

According to some implementations, the copy of the previous virtualized resource 124 may be migrated to the emulated edge location 128 via control plane signaling by the network orchestrator 144. For example, the network orchestrator 144 may identify a slot within the emulated edge location 128 that is suitable for the updated virtualized resource 129 and which corresponds to the slot in the edge location 104 that is allocated to the previous virtualized resource 124. The network orchestrator 144 may instruct the edge orchestrator 146 to transmit the copied data from the edge location 104 to the identified slot in the emulated edge location 128. In response, the edge orchestrator 146 and/or a host in the edge location 104 storing the copied data may transmit the copied data to the identified slot. Upon receiving the copied data, the host in the region 102 in which the slot is included may launch the updated virtualized resource 129 based on the copied data. In some cases, the host may confirm, to the network orchestrator 144, that the copy of the previous virtualized resource 124 was successfully migrated to the emulated edge location 128.

The new virtualized resource 126 and/or the updated virtualized resource 129 may be modified within the emulated edge location 128. For example, the user(s) may direct the user device(s) 118 to transmit, to the emulation engine 142, a request for a modification to the new virtualized resource 126 and/or the updated virtualized resource 129. In some cases, the modification can be directed via the development environment provided by the emulation engine 142. In response to the direction by the user device(s) 118, the emulation engine 142 may modify the new virtualized resource 126 and/or the updated virtualized resource 129. Accordingly, the new virtualized resource 126 and/or the updated virtualized resource 129 can be changed on-demand by the user(s).

In various examples, the new virtualized resource 126 and/or the updated virtualized resource 129 can be tested in the emulated edge location 128. For example, specified input data can be input into the new virtualized resource 126 and/or the updated virtualized resource 129 and output data from the new virtualized resource 126 and/or the updated virtualized resource 129 can be identified. In some cases, the input data can be specified by the user(s) of the user device(s) 118. For example, the user(s) may provide, to the emulation engine 142 via the user device(s) 118, predetermined input data with which the user(s) would like to test the new virtualized resource 126 and/or the updated virtualized resource 129. In some cases, the edge orchestrator 146 can indicate data transmitted within the edge location 104 that can be used as the input data. For example, the edge orchestrator 146 may report data input into the previous virtualized resource 124 to the emulation engine 142, which can be used as input data for the updated virtualized resource 129. According to some cases, the edge orchestrator 146 may report data transmitted from the external system 120 over the external gateway 122 to the emulation engine 142, and the emulation engine 142 can use the data to direct the functionality of the emulated external system 134 within the emulated edge location 128, and the emulated external system 134 may provide the input data to the new virtualized resource 126 and/or the updated virtualized resource 129 by carrying out that functionality.

The output data can be collected by the emulation engine 142 and reported to the user device(s) 118. For instance, the emulation engine 142 may identify the output data by intercepting and/or copying data traffic within the emulated edge location 128. The user device(s) 118 can output the output data for perusal by the user(s). If the user(s) decide that the output data is acceptable, the user(s) may seek to establish the tested new virtualized resource 126 and/or the updated virtualized resource 129 in the edge location 104.

According to some examples, the emulation engine 142 can report other types of results to the user device(s) 118 based on the testing of the new virtualized resource 126 and/or the updated virtualized resource 129. For example, the emulation engine 142 may identify whether the new virtualized resource and/or the updated virtualized resource 129 crashes in the emulated edge location 128 during testing and may report the crash to the user device(s) 118. In some cases, the emulated edge location 128 may have a limited available capacity (e.g., based on the limited capacity of the existing edge location 104) that is insufficient to accommodate the new virtualized resource 126 and/or the updated virtualized resource 129, and the emulation engine 142 may therefore report that the edge location 104 is expected to have insufficient capacity to accommodate the new virtualized resource 126 and/or the updated virtualized resource 129. In some cases, the emulation engine 142 may identify a predetermined edge location type that provides one or more specifications of the edge location 104 (e.g., a capacity, a number of hosts, a type of hosts, or the like) that can accommodate the new virtualized resource 126 and/or the updated virtualized resource 129, based on the results of testing the new virtualized resource 126 and/or the updated virtualized resource 129. For example, the emulated edge location 128 may have an elastic capacity within the region 102, such that the capacity can be increased or decreased as necessary to accommodate the functionality of the new virtualized resource 126 and/or the updated virtualized resource 129. The emulation engine 142 may identify the capacity of the emulated edge location 128 during testing, and use the capacity to provide a recommendation for an upgrade to the edge location 104 (e.g., a number of additional edge hosts 110) and/or a type of a new edge location (e.g., a number, amount, and type of edge hosts 110 in the new edge location) that can accommodate the new virtualized resource 126 and/or the updated virtualized resource 129. Accordingly, the user(s) can identify a type of the edge location 104 that is appropriate for their needs based on the results of testing the new virtualized resource 126 and/or the updated virtualized resource 129 within the emulated edge location 128.

In various implementations, the new virtualized resource 126 may be migrated from the emulated edge location 128 to the edge location 104. The user(s) may request that the new virtualized resource 126 is migrated via a user interface output on the user device(s) 118 that is associated with the emulation engine 142. In some cases, the user(s) can specify a specific slot within at least one physical host in the edge location 104 to which the new virtualized resource 126 is to be migrated. In some examples, the network orchestrator 144 may identify an available slot within the edge location 104 that is suitable for the new virtualized resource 126. In various cases, the network orchestrator 144 may orchestrate the migration of the new virtualized resource 126 from a source host in the region 102 to a destination host in the edge location 104. For example, the network orchestrator 144 may transmit, to the source host, a request to migrate the new virtualized resource 126 to the destination host. In response, the source host may transmit data associated with the new virtualized resource 126 to the destination host over the tunnel 116. The data may include any combination of state data of the new virtualized resource 126, data encoding instructions for operations of the new virtualized resource 126, data stored in a block storage volume associated with the new virtualized resource 126, local storage of the new virtualized resource 126, or the like. Upon receiving the data, the destination host may launch the new virtualized resource 126. Accordingly, the new virtualized resource 126 may be migrated from the source host in the region 102 to the destination host in the edge location 104. In some implementations, the destination host may transmit a confirmation message to the network orchestrator 144 (e.g., over the tunnel 116) indicating that the new virtualized resource 126 was successfully migrated.

Although not illustrated, in some implementations, the new virtualized resource 126 and/or the updated virtualized resource 129 may be migrated between multiple emulated edge locations (including, e.g., the emulated edge location 128) in the region 102. For example, a first emulated edge location may be allocated within a first set of computing resources in a first set of the primary hosts 108, and a second emulated edge location may be allocated within a second set of computing resources in a second set of the primary hosts 108, wherein the first emulated edge location may represent a beta testing environment and the second emulated edge location may represent a gamma testing environment. In some cases, the new virtualized resource 126 and/or the updated virtualized resource 129 can be developed in the first emulated edge location representing the beta testing environment, and the new virtualized resource 126 and/or the updated virtualized resource 129 can be tested in the second emulated edge location representing the gamma testing environment. According to some examples, the first set of the primary hosts 108 may be different than the second set of the primary hosts 108. For example, the second set of the primary hosts 108 may more closely approximate the edge hosts 110 of the edge location 104 than the first set of the primary hosts 108. In some cases, the second set of the primary hosts 108 may have a similar type (e.g., similar memory capacity, similar processing capacity, the same operating system, the same vendor, or the like) to the edge hosts 110. Once the new virtualized resource 126 and/or the updated virtualized resource 129 have been successfully tested within the gamma testing environment, the new virtualized resource 126 and/or the updated virtualized resource may be migrated to at least one of the edge hosts 110 in the edge location 104.

According to some examples, the updated virtualized resource 129 may be migrated from the emulated edge location 128 to the edge location 104. In various cases, the updated virtualized resource 129 may replace the previous virtualized resource 124 in a slot within a destination host in the edge location 104. The network orchestrator 144, for instance, may transmit, to the destination host, a request to clear the slot occupied by the previous virtualized resource 124. In some examples, the destination host may hibernate the previous virtualized resource 124. For example, the destination host may at least temporarily store data associated with the previous virtualized resource 124 in a rollback storage 148 within the edge location 104. The data may include any combination of state data of the previous virtualized resource 124, data encoding instructions for operations of the previous virtualized resource 124, data stored in a block storage volume associated with the previous virtualized resource 124, local storage of the previous virtualized resource 124, or the like. In some cases, the data may include snapshot data indicating a point-in-time state and/or stored data associated with the previous virtualized resource 124. Although not illustrated in FIG. 1, in various implementations, the rollback storage 148, and any interfaces attached to the rollback storage 148, may be emulated within the emulated edge location 128.

The rollback storage 148 may at least temporarily store the data associated with the previous virtualized resource 124 in memory within the edge location 104. The rollback storage 148 may be part of the destination host or part of a different host within the edge location 104. After storing the data associated with the previous virtualized resource 124 in the rollback storage 148, the destination host may clear and otherwise prepare the slot for the migration of the updated virtualized resource 129. In some cases, the destination host may transmit a confirmation message to the network orchestrator 144 indicating that the slot is clear. The network orchestrator 144 may transmit, to a source host in the region 102 in which the updated virtualized resource 129 occupies, a request to migrate the updated virtualized resource 129 in the prepared slot of the destination host. In response, the source host may at least attempt to transmit data associated with the updated virtualized resource 129 from the region 102 to the destination host in the edge location 104 via the tunnel 116.

In some cases, however, the tunnel 116 may become interrupted during the transfer of the data associated with the updated virtualized resource 129. For example, at least one of the external network(s) 106 may have an outage that may prevent the transfer of the data over the tunnel 116. The interruption in the tunnel 116 may be identified by the destination host in the edge location 104. For example, the data associated with the updated virtualized resource 129 may be transferred in a stream of data packets, and the destination host may determine that a time period since the most recently received data packet has exceeded a predetermined threshold. Upon identifying the interruption, the destination host may rollback the migration of the updated virtualized resource 129 by extracting the data associated with the previous virtualized resource 124 from the rollback storage 148 and may relaunch the previous virtualized resource 124 in the slot of the destination host. Accordingly, the previous virtualized resource 124 may come out of hibernation to continue ongoing operations of the edge location 104, even when the migration of the updated virtualized resource 129 is interrupted. In some implementations, the network orchestrator 144 may identify that the interruption has occurred and may reinitiate migration of the updated virtualized resource 129 in response to identifying that the tunnel 116 has been reestablished.

In various implementations, the data associated with the updated virtualized resource 129 may be fully transferred to the destination host. Accordingly, the destination host may launch the updated virtualized resource 129 within the edge location. The edge interface(s) 140 that previously connected the previous virtualized resource 124 to the customer network 114 may be reallocated to the updated virtualized resource 129. In some cases, an address (e.g., an IP address) of the previous virtualized resource 124 may be reallocated to the updated virtualized resource 129. Accordingly, the updated virtualized resource 129 may take the place of the previous virtualized resource 124 in the edge location 104. The destination host may, in some cases, send a message to the network orchestrator 144 confirming that the migration of the updated virtualized resource 129 was successful. In some cases, the destination host may delete the data associated with the previous virtualized resource in the rollback storage 148, in order to conserve memory resources within the edge location 104.

According to various implementations described herein, the environment 100 can be used to develop and test virtualized resources in an emulated edge location. Further, the environment 100 can be used to migrate the tested virtualized resources to a corresponding non-emulated edge location.

A particular example will now be described with reference to the example environment 100 depicted in FIG. 1. An example organization may seek to use an edge location (e.g., the edge location 104) on the premise of an automated factory (e.g., the external system 120) associated with the organization. In particular, the example organization may seek to develop a specific VM that controls a robot within the factory. Accordingly, the organization may request establishment of an elastic emulated edge location (e.g., the emulated edge location 128) within a region of a cloud-provider region. A developer within the organization may develop, through a user device (e.g., the user device(s) 118), a new VM (e.g., the new virtualized resource 126) that is configured to control the robot. The developer may specify example feedback data that will be input into the new VM during deployment and use the example feedback data as input data into the emulated edge location. The developer may observe data output by the new VM and may continue to modify the new VM until the data output by the new VM is satisfactory. In some cases, the developer may identify the capacity of an appropriate edge location that can accommodate the new VM while the new VM is controlling the robot in the factory. The organization can order a non-emulated edge location (e.g., the edge location 104) with enough servers and enough computing resources to provide at least the appropriate capacity and connect the edge location to the factory. Further, the developer can trigger migration of the new VM to the edge location. Thus, the new VM can be used to control the robot in the factory once the developer has determined that the new VM is reliable enough for real-world deployment.

Further, the example organization may seek to update the VM based on changing conditions at the factory or ongoing problems with the VM as deployed. For example, the factory may be operating under colder conditions than normal, which may affect the sensors of the robot. Accordingly, the developer may develop an updated version of the VM (e.g., the updated virtualized resource 129) in the emulated edge location. The developer may ensure that the capacity of the emulated edge location is limited to the capacity of the edge location 104, to mimic the conditions in which the VM will operate during real-world deployment. The developer may also ensure that the emulated edge location has the same configuration as the real-world edge location, so that the VM can be tested in similar conditions to the edge location. In some cases, the developer can copy the previous version of the VM (e.g., the previous virtualized resource 124) to the emulated edge location, change code associated with the VM to accommodate new types of data transmitted by the sensors of the robot due to the colder conditions in the factory, and test the expected operations of the updated version of the VM in the emulated edge location. Once the developer has identified that the updated version of the VM is ready for real-world deployment, the developer may trigger migration of the updated version of the VM to the edge location. However, in some cases, there may be an outage in a network over which the updated version of the VM is communicated (e.g., a power outage has occurred that has suspended the functionality of the network). In this case, the edge location 104 may automatically reload the previous version of the VM in a rollback procedure. Once the outage has been resolved, the migration can be retried and the updated version of the VM may successfully replace the previous version of the VM in the edge location 104. Thus, the new version of the VM can be seamlessly developed and incorporated into the existing edge location 104.

Figure 2:
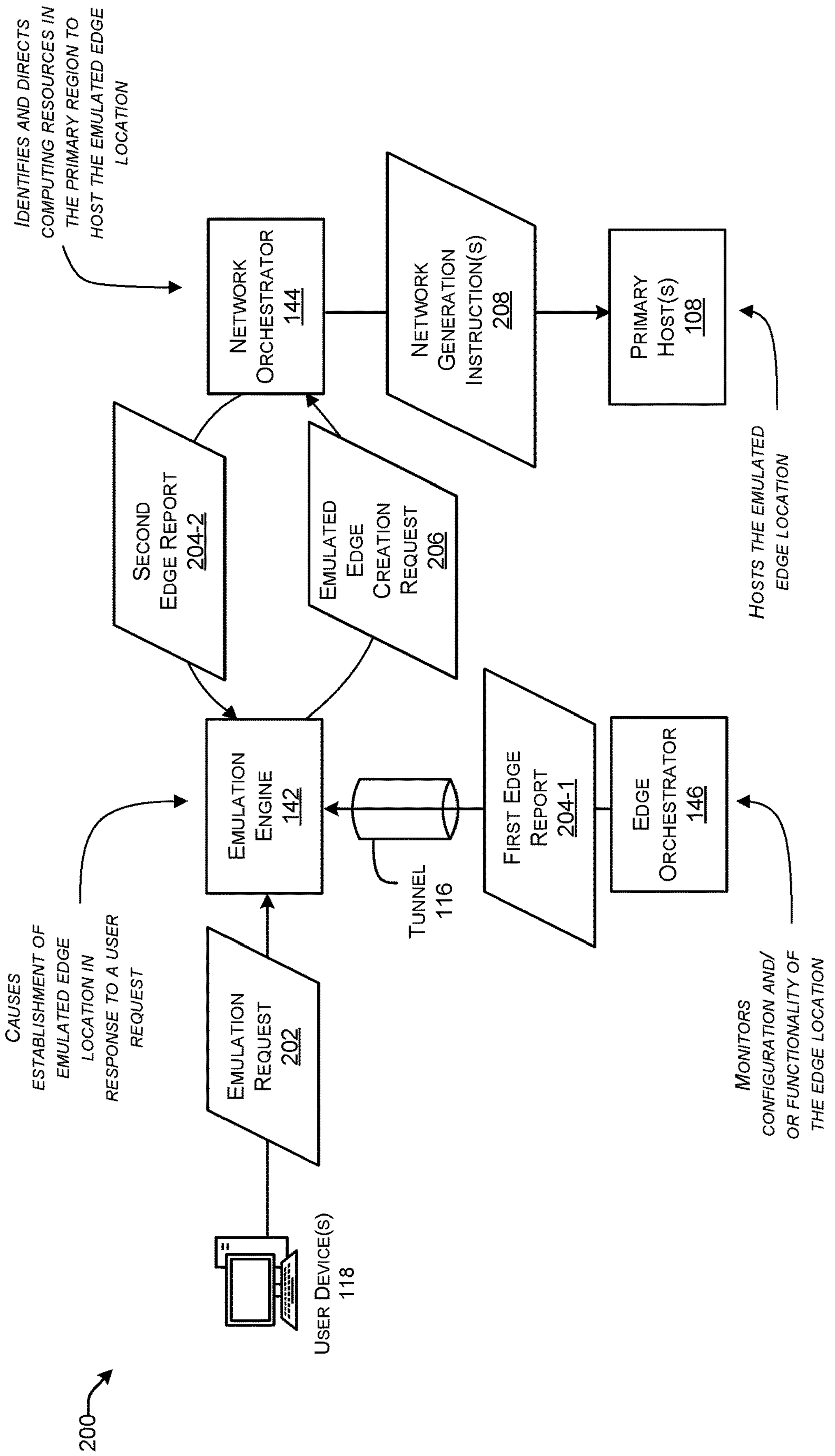
FIG. 2 illustrates example signaling for establishing an emulated edge location in a region.

FIG. 2 illustrates example signaling 200 for establishing an emulated edge location in a region. As illustrated, the signaling 200 includes communications between at least one of the primary hosts 108, the tunnel 116, the user device(s) 118, the emulation engine 142, the network orchestrator 144, and the edge orchestrator 146, which were described above with reference to FIG. 1.

The user device(s) 118 may transmit an emulation request 202 to the emulation engine 142. The emulation request 202 may specify one or more characteristics of an emulated edge location to be generated in a region of a cloud-provider network. In some cases, the emulation request 202 can indicate the configuration, capacity, nodes, interfaces, operating conditions, or the like, of the emulated edge location.

In some instances, the emulation request 202 can request emulation of an existing non-emulated edge location that is connected to the region. According to some examples, an edge orchestrator 146 within the non-emulated edge location can transmit a first edge report 204-1 to the emulation engine 142 over the tunnel 116. The first edge report 204-1 can provide one or more characteristics of the non-emulated edge location. For instance, the first edge report 204-1 can specify the configuration, capacity, nodes, interfaces, operating conditions, or the like, of the non-emulated edge location. Thus, the emulation engine 142 may identify at least some of the characteristics of the emulated edge location based on the characteristics of the non-emulated edge location.

In various implementations, the network orchestrator 144, or some other entity within the region, may provide a second edge report 204-2 to the emulation engine 142. The second edge report 204-2 may specify and/or estimate the configuration, capacity, nodes, interfaces, operating conditions, or the like, of the non-emulated edge location. For example, the network orchestrator 144 can maintain a record of the estimated configuration in the non-emulated edge location. In some cases, the first edge report 204-1 and/or the second edge report 204-2 can be omitted from the signaling 200.

The emulation engine 142 may transmit an emulated edge creation request 206 to the network orchestrator 144. The emulated edge creation request 206 may specify the characteristics of the emulated edge location based on at least one of the emulation request 202, the first edge report 204-1, or the second edge report 204-2. The network orchestrator 144 may identify a set of computing resources in the primary host(s) 108 that can accommodate the requested emulated region, and may establish the emulated region by transmitting at least one network generation instruction 208 to the primary host(s) 108. Accordingly, the set of computing resources may be reserved for the emulated edge location. In various examples, the network generation instruction(s) 208 may cause the primary host(s) 108 to establish a Virtual Private Cloud (VPC) within the region. The VPC and the subnet may be modeled after the existing non-emulated edge location. For example, the VPC may include multiple virtualized resources modeled after virtualized and/or physical resources within the non-emulated edge location, as well as multiple virtualized interfaces modeled after virtualized and/or physical interfaces within the non-emulated edge location. In some cases, the VPC can include a virtualized resource modeled after an external system connected to the non-emulated edge location, as well as a virtualized interface modeled after a gateway that connects the non-emulated edge location to the external system. Accordingly, the emulated edge location can function at least similarly to the non-emulated edge location. In some cases, the VPC and the subnet may be specified in the emulation request 202. As a result of the signaling 200, the emulated edge location can be established in the region.

Figure 3A:
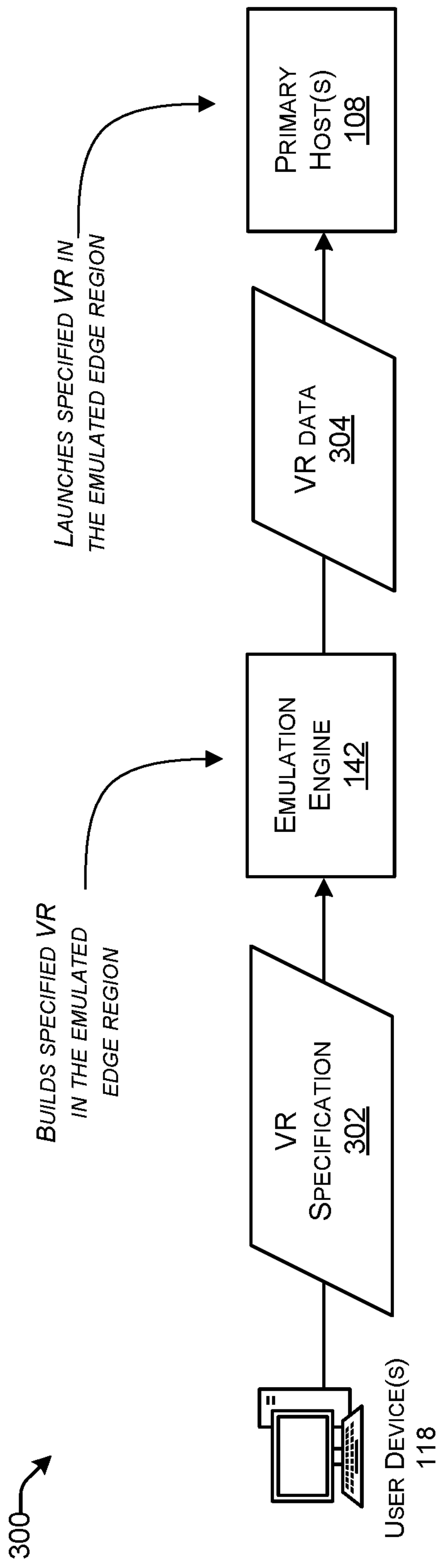
FIG. 3A illustrates example signaling for building a new virtualized resource within an emulated edge location that is in a region of a cloud-provider network.

FIG. 3A illustrates example signaling 300 for building a new virtualized resource within an emulated edge location that is in a region of a cloud-provider network. As illustrated in FIG. 3A, the signaling 300 may include at least one of the primary hosts 108, communications between the user device(s) 118, and the emulation engine 142 described above with reference to FIG. 1.

The user device(s) 118 may transmit a virtualized resource specification 302 to the emulation engine 142. The virtualized resource specification 302 may indicate one or more characteristics of a new virtualized resource to be generated in the emulated edge location 128. For example, the virtualized resource specification 302 may indicate various instructions governing operations of the new virtualized resource, to be performed by one or more computing resources hosting the new virtualized resource. In some examples, the virtualized resource specification 302 may further indicate how the new virtualized resource is to be connected within the emulated edge location, such as desired interfaces and/or routing information associated with the new virtualized resource.

The emulation engine 142 may build the specified virtualized resource in the emulated edge location by transmitting virtualized resource data 304 to the primary host(s) 108. For example, the virtualized resource data 304 may include data associated with the specified virtualized resource, such as any combination of state data of the virtualized resource, data encoding instructions for operations of the virtualized resource, data stored in a block storage volume associated with the virtualized resource, local storage of the virtualized resource, or the like. In some cases, the virtualized resource data 304 may indicate a connectivity of the virtualized resource with the rest of the emulated edge location (e.g., one or more interfaces that should be attached to the virtualized resource). Upon receiving the virtualized resource data 304, the primary host(s) 108 within the region may launch the specified virtualized resource in one or more computing resources allocated to the emulated edge location. Accordingly, the new virtualized resource can be generated in the emulated edge location.

Figure 3B:
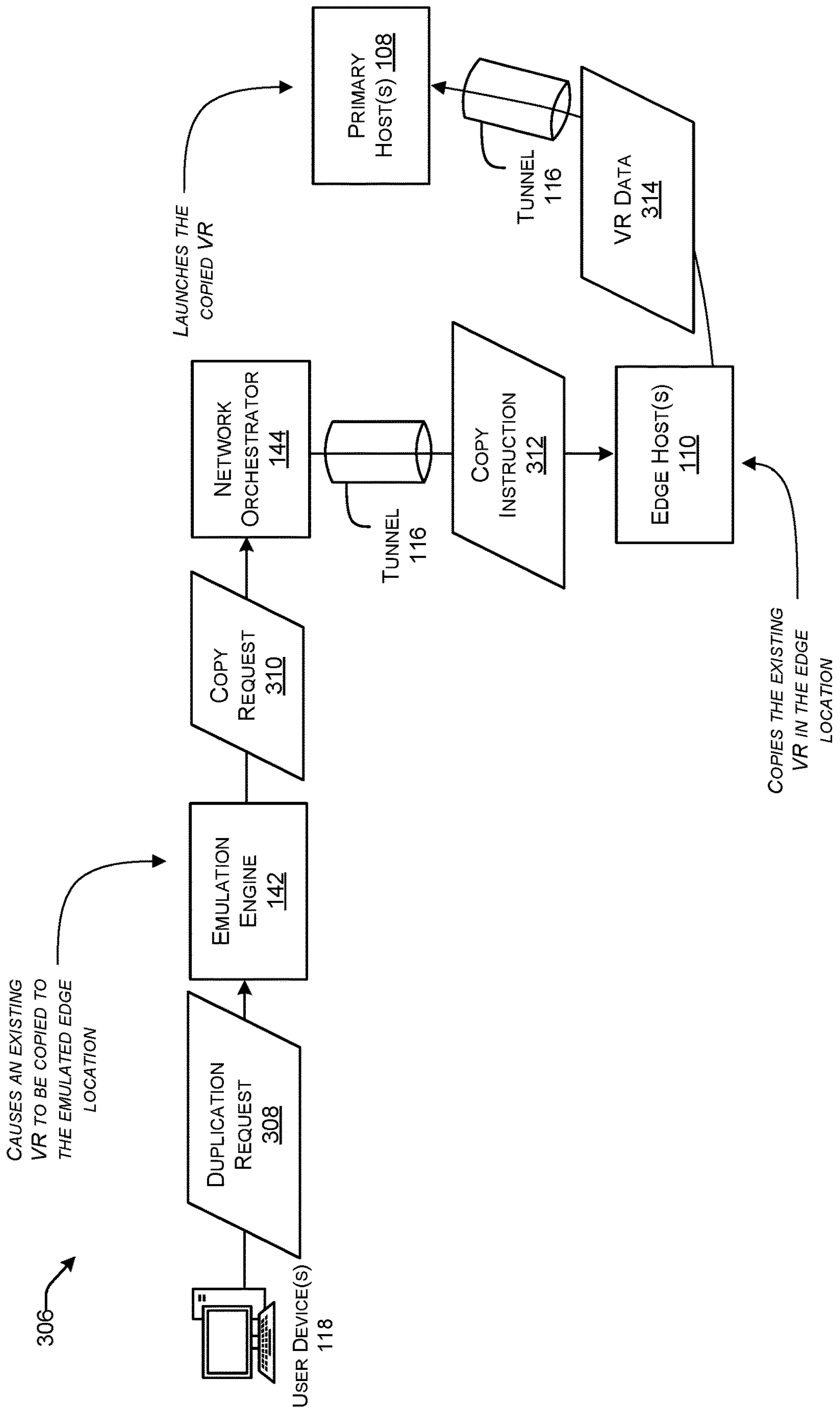
FIG. 3B illustrates example signaling for copying an existing virtualized resource from a non-emulated edge location to an emulated edge location for development and testing.

FIG. 3B illustrates example signaling 306 for copying an existing virtualized resource from a non-emulated edge location to an emulated edge location for development and testing. As illustrated, the signaling 306 includes communications between at least one of the primary hosts 108, at least one of the edge hosts 110, the tunnel 116, the user device(s) 118, and the network orchestrator 144, which are described above with reference to FIG. 1.

The user device(s) 118 may transmit a duplication request 308 to the emulation engine 142. The duplication request 308 may specify an existing virtualized resource in a non-emulated edge location, which may be connected to a region within a cloud-provider network. For example, the duplication request 308 may indicate an identifier of the virtualized resource (e.g., an alphanumeric string identifying the virtualized resource among various virtualized resources within the region and/or the non-emulated edge location). In some cases, the duplication request 308 can identify an address of the virtualized resource, such as an IP address of the virtualized resource in the non-emulated edge location.

The emulation engine 142 may cause the virtualized resource to be copied from the non-emulated edge location into an emulated edge location within the region. The emulation engine 142 may transmit, to the network orchestrator 144, a copy request 310 specifying the virtualized resource. The network orchestrator 144 may identify a slot within computing resources of the primary host(s) 108 that are allocated to the emulated edge location and that can accommodate the virtualized resource. The slot in the computing resources of the primary host(s) 108 may accommodate the virtualized resource similarly to a slot in the computing resources of the edge host(s) 110 that accommodates the virtualized resource in the non-emulated edge location.

The network orchestrator 144 may transmit, to the edge host(s) 110, a copy instruction 312 requesting the edge host(s) 110 to copy the virtualized resource and to migrate the copied virtualized resource to the designated slot in the computing resources of the primary hosts 108. The copy instruction 312 may be transmitted over the tunnel 116. Upon receiving the copy instruction 312, the edge host(s) 110 may copy data associated with the virtualize resource in the edge location as the virtualized resource is operating in the edge location. Accordingly, the virtualized resource can be copied without significantly impacting ongoing operations of the virtualized resource in the edge location. The copied data may be stored and/or cached at least temporarily in the edge host(s) 110. In various implementations, the edge host may transmit the copied data as virtualized resource data 314 to the primary host(s) 108 in the emulated edge location. The virtualized resource data 314 may be transmitted over the tunnel 116. The virtualized resource data 314 may, in some cases, specify the designated slot for the copied virtualized resource in the primary host(s) 108.

Upon receiving the virtualized resource data 314, the primary host(s) 108 may launch the copied virtualized resource in the designated slot. Accordingly, the existing virtualized resource can be copied and launched in the emulated edge location.

Figure 4:
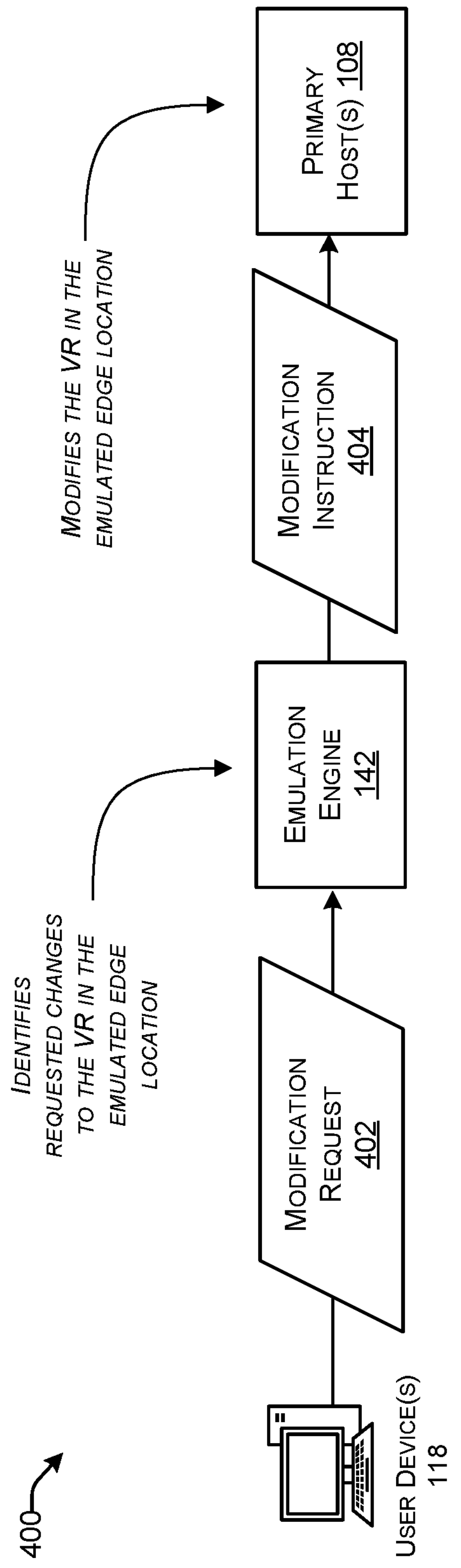
FIG. 4 illustrates example signaling for modifying a virtualized resource in an emulated edge location.

FIG. 4 illustrates example signaling 400 for modifying a virtualized resource in an emulated edge location. As illustrated, the signaling 400 includes communications between at least one of the primary hosts 108, the user device(s) 118, and the emulation engine 142, which are described above with reference to FIG. 1.

The user device(s) 118 may transmit a modification request 402 to the emulation engine 142. The modification request 402 may specify one or more changes to a virtualized resource in an emulated edge location within a region of a cloud-provider network. For example, the modification request 402 may specify a change to the functionality of the virtualized resource, the operations of the virtualized resource, a state of the virtualized resource, a connectivity of the virtualized resource within the emulated edge location, or the like.

The emulation engine 142, in turn, may identify the primary host(s) 108 currently accommodating the virtualized resource in the emulated edge location. The emulation engine 142 may transmit, to the primary host(s) 108, a modification instruction 404 that instructs the primary host(s) 108 to make the requested change(s) to the virtualized resource. In response, the primary host(s) 108 may make the appropriate changes to the virtualized resource. Thus, the virtualized resource can be modified before or during testing in the emulated edge location.

Figure 5:
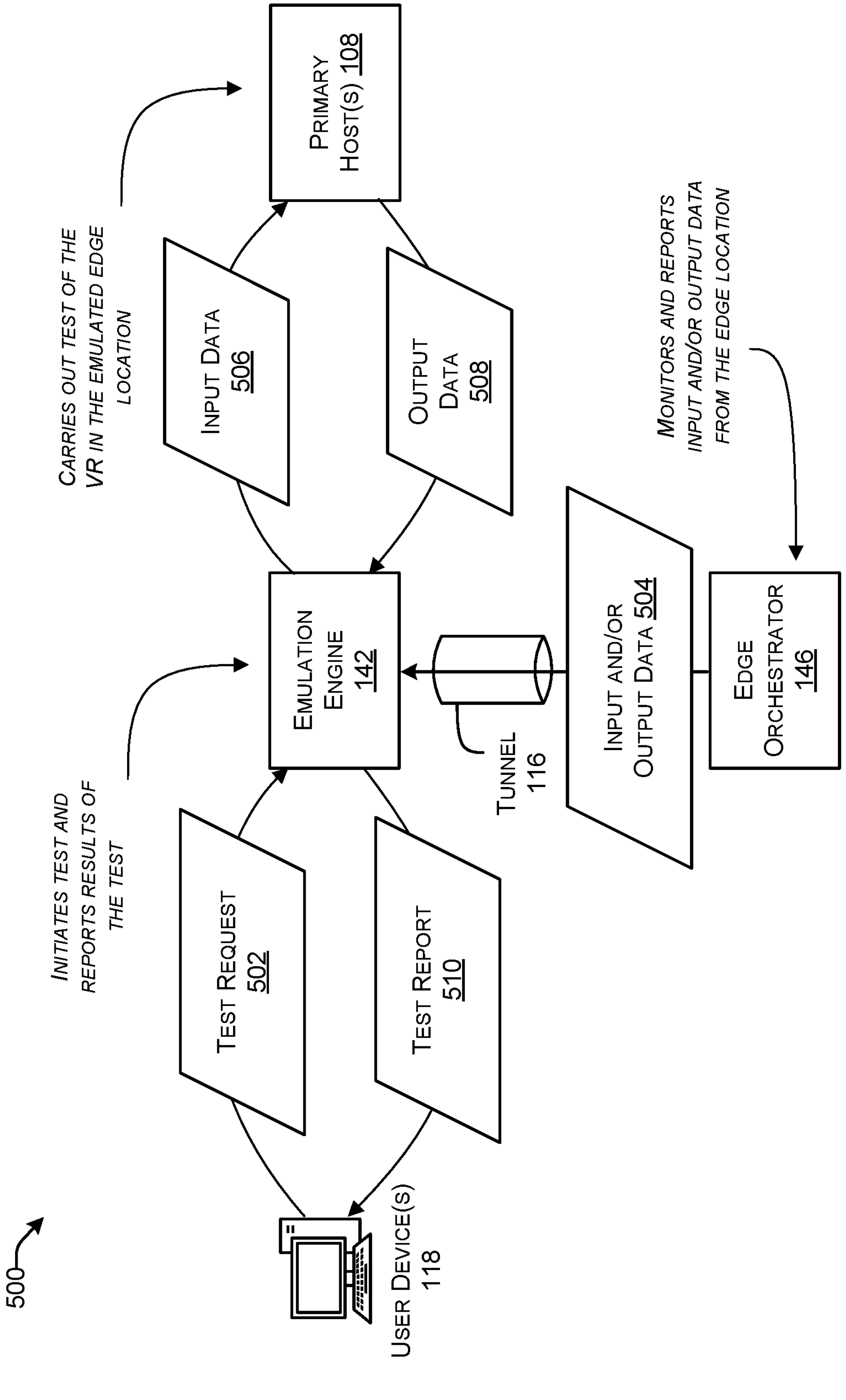
FIG. 5 illustrates example signaling for testing a virtualized resource in an emulated edge location.

FIG. 5 illustrates example signaling 500 for testing a virtualized resource in an emulated edge location. As illustrated, the signaling 500 can include communications between at least one of the primary hosts 108, the tunnel 116, the user device(s) 118, the emulation engine 142, and the edge orchestrator 146, which are described above with reference to FIG. 1.

The user device(s) 118 may transmit, to the emulation engine 142, a test request 502. The test request 502 may specify one or more conditions of a test to be carried out upon a virtualized resource within an emulated edge location in a region of a cloud-provider network. For example, the test request 502 may include predetermined input data to be input to a node of the emulated edge location during the testing. For instance, the input data may be data to be input into the virtualized resource itself, data to be input into another virtualized resource operating within the emulated edge location, or the like. In some cases, the test request 502 may include predetermined output data of a node of the emulated edge location. For instance, the predetermined output data can include data that is expected to be output by the virtualized resource during testing.

In various examples, the emulation engine 142 may receive input and/or output data 504 from the edge orchestrator 146. The input and/or output data 504 may include data input and/or output to any node within a non-emulated edge location outside of the region. For instance, the input and/or output data 504 may include data input into a virtualized resource within the non-emulated edge location, data output by the virtualized resource within the non-emulated edge location, or a combination thereof. In various examples, the edge orchestrator 146 may monitor and copy input and/or output data from the virtualized resource in the non-emulated edge location and may transmit the copied data as the input and/or output data 504.

The emulation engine 142 may generate input data 506 based on the test request 502, the input and/or output data 504, or a combination thereof. The emulation engine 142 may transmit the input data 506 to the primary host(s) 108 with computing resources designated to the emulated edge location. In response to receiving the input data 506, the primary host(s) 108 may input the input data 506 into one or more nodes within the emulated edge location. For instance, the primary host(s) 108 may input the input data 506 into the virtualized resource under development in the emulated edge location.

The primary host(s) 108 may transmit output data 508 to the emulation engine 142. The output data 508 may include data output by any of the nodes in the emulated edge location in response to processing the input data 506. For example, the output data 508 may include data output by the virtualized resource under development in the emulated edge location.

The emulation engine 142 may generate a test report 510 based on the output data 508. For example, the test report 510 may include at least a portion of the output data 508. In some cases, the emulation engine 142 may compare the output data 508 to the expected output data (e.g., as specified by the test request 502, the input and/or output data 504, or a combination thereof) and generate the test report 510 based on the comparison. For example, the test report 510 may indicate any differences between the output data 508 and the expected output data. In some cases, the test report 510 may indicate that the virtualized resource has failed the test if the output data 508 is significantly different than the expected output data. For example, the test report 510 may indicate that the virtualized resource has failed if more than a threshold amount (e.g., 5%, 10%, 15%, or the like) of bits in the output data 508 are different than bits in the expected output data. In some cases, the test report 510 may indicate that the virtualized resource has been successfully tested if more than a threshold amount (e.g., 80%, 90%, 99%, or the like) of bits in the output data 508 match the bits in the expected output data. The emulation engine 142 may transmit the test report 510 to the user device(s) 118. Thus, a developer associated with the user device(s) 118 can determine whether the virtualized resource is ready to be launched in the edge location and/or whether the virtualized resource requires further modifications before it is ready to be launched in the edge location.

Figure 6:
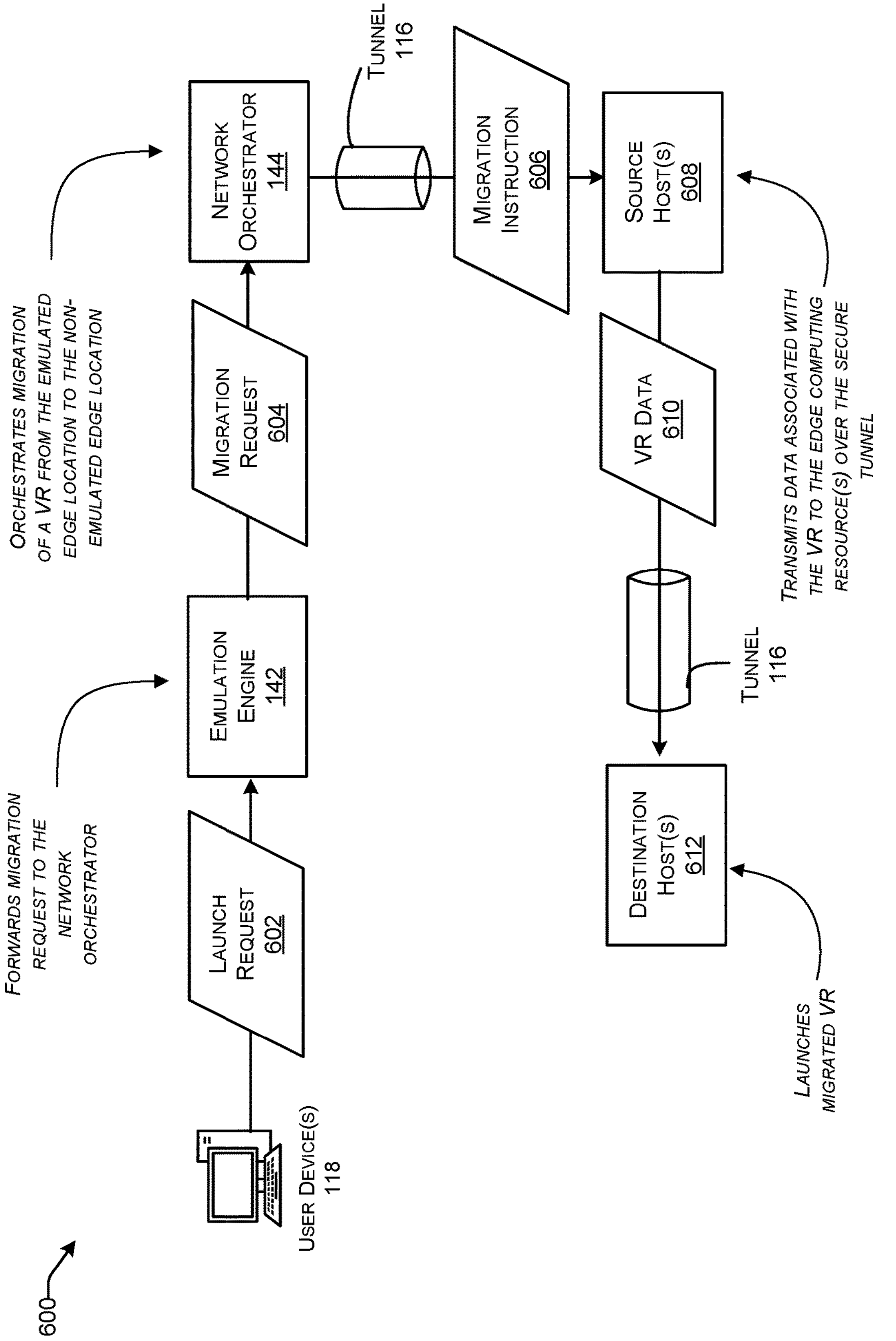
FIG. 6 illustrates example signaling for migrating a virtualized resource from an emulated edge location to a non-emulated edge location.

FIG. 6 illustrates example signaling 600 for migrating a virtualized resource from an emulated edge location to a non-emulated edge location. As illustrated, the signaling 600 can include communications between the user device(s) 118, the tunnel 116, the emulation engine 142, and the network orchestrator 144, which are described above with reference to FIG. 1.

The user device(s) 118 may transmit a launch request 602 to the emulation engine 142. The launch request 602 may be a request to launch a virtualized resource, which may have been tested in an emulated edge location, in a non-emulated edge location. The virtualized resource may be hosted by computing resources in a primary host within a cloud-provider network. The launch request 602 may specify the virtualized resource to be migrated. In some cases, the launch request 602 may specify the edge location to which the virtualized resource is to be migrated.

The emulation engine 142 may transmit a migration request 604 to the network orchestrator 144. The migration request may indicate the virtualized resource to be migrated. In response to receiving the migration request 604, the network orchestrator 144 may orchestrate migration of the virtualized resource from the emulated edge location to the non-emulated edge location. The virtualized resource may be occupying at least one first computing resource of at least one source host 608 in the region. The source host(s) 608, for example, may be at least one of the primary hosts 108 described above with reference to FIG. 1. The at least one first computing resource may be allocated to the emulated edge location. In various examples, the network orchestrator 144 may identify a slot in at least one second computing resource in the non-emulated edge location as a target for the migration of the virtualized resource. The slot may be included in at least one destination host 612. The destination host(s) 612, for instance, may be at least one of the edge hosts 110 described above with reference to FIG. 1.

The network orchestrator 144 may transmit, to the source host(s) 608 a migration instruction 606. The migration instruction 606 may be transmitted over the tunnel 116. The migration instruction 606 may indicate the virtualized resource as well as the destination host(s) 612 and/or the target slot in the destination host(s) 612. The migration instruction 606 may cause the source host(s) 608 to transfer the virtualized resource to the destination host(s) 612. In some cases, the network orchestrator 144 may also transmit, to the destination host(s) 612 a request to prepare the slot for migration of the virtualized resource. The request to prepare the slot may cause the destination host(s) 612 to hibernate or otherwise remove an existing virtualized resource from the target slot.

In various implementations, the source host(s) 608 may transmit virtualized resource data 610 to the destination host(s) 612 over the tunnel 116. The virtualized resource data 610 may include any combination of state data of the virtualized resource, data encoding instructions for operations of the virtualized resource, data stored in a block storage volume associated with the virtualized resource, local storage of the virtualized resource, or the like.

The virtualized resource data 610 may enable the destination host(s) 612 to launch the virtualized resource. Accordingly, upon receiving the virtualized resource data 610, the destination host(s) 612 may launch the migrated virtualized resource in the target slot. The operations of the virtualized resource may resume and be performed by the destination host(s) 612.

Figure 7:
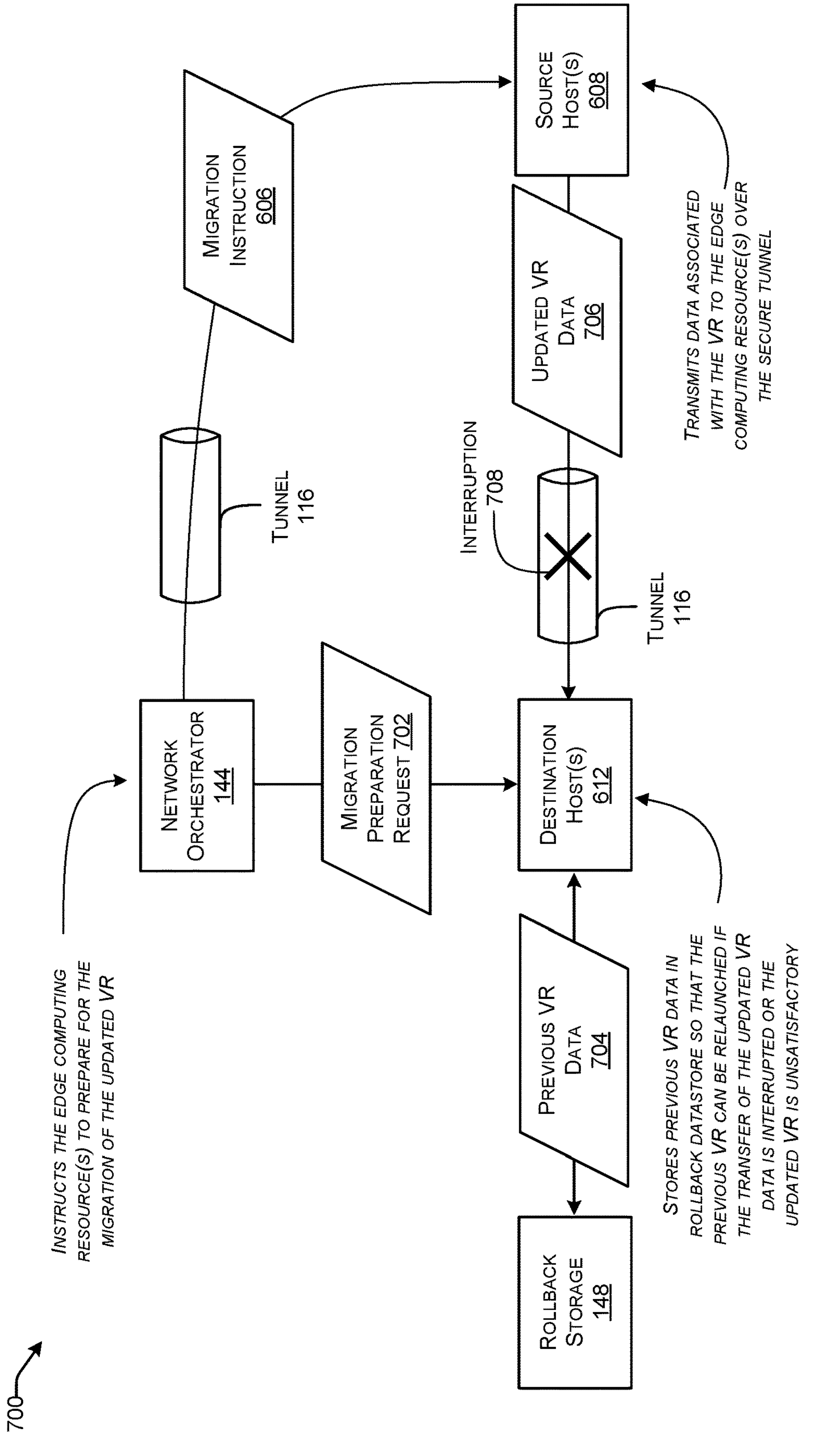
FIG. 7 illustrates example signaling for hibernating and/or rolling back migration of an updated virtualized resource.

FIG. 7 illustrates example signaling 700 for hibernating and/or rolling back migration of an updated virtualized resource. As illustrated, the signaling 700 includes communications between the tunnel 116, the network orchestrator 144, and the rollback storage 148, which are described above with reference to FIG. 1. Further, the signaling 700 includes the migration instruction 606 and includes communications between the source host(s) 608 and destination host(s) 612 described above with reference to FIG. 6.

In various implementations, the network orchestrator 144 may at least attempt to orchestrate migration of a virtualized resource from at least one first computing resource in the source host(s) 608 to at least one second computing resource in the destination host(s) 612. The network orchestrator 144 may transmit a migration preparation request 702 to the destination host(s) 612. The migration preparation request 702 may cause the destination host(s) 612 to prepare a slot for migration of an updated virtualized resource. In various cases, the slot may be occupied by a previous virtualized resource.

The destination host(s) 612 may transfer previous virtualized resource data 704 to the rollback storage in response to receiving the migration preparation request 702. The previous virtualized resource data 704 may include any combination of state data of the previous virtualized resource, data encoding instructions for operations of the previous virtualized resource, data stored in a block storage volume associated with the previous virtualized resource, local storage of the previous virtualized resource, or the like. Once the previous virtualized resource data 704 has been transferred to the rollback storage 148, the slot may be unoccupied and ready to receive the updated virtualized resource.

In response to receiving the migration instruction 606, the source host(s) 608 may at least attempt to transfer updated virtualized resource data 706 to the destination host(s) 612 via the tunnel 116. The updated virtualized resource data 706 may include any combination of state data of the previous virtualized resource, data encoding instructions for operations of the previous virtualized resource, data stored in a block storage volume associated with the previous virtualized resource, local storage of the previous virtualized resource, or the like.

However, in some cases, the tunnel 116 may be interrupted by an interruption 708 before the updated virtualized resource data 706 is fully transferred to the destination host(s) 612, such that the destination host(s) 612 may be unable to launch the updated virtualized resource. For example, a network outage may occur in at least one of the networks over which the tunnel 116 traverses. In response to identifying the interruption 708, the destination host(s) 612 may extract the previous virtualized resource data 704 from the rollback storage 148 and relaunch the previous virtualized resource in the slot. Accordingly, operations of the edge location can resume, even when the attempted migration of the updated virtualized resource is interrupted. In some cases, the migration of the updated virtualized resource can be resumed and/or restarted once the interruption 708 is resolved.

The updated virtualized resource may be launched in the computing resource(s) of the destination host(s) 612 once the updated virtualized resource data 706 is fully transferred to the destination host(s) 612. However, in some cases, the destination host(s) 612 may relaunch the previous virtualized resource using the previous virtualized resource data 704. For instance, upon launching the updated virtualized resource, the destination host(s) 612 may identify that the updated virtualized resource has crashed or is otherwise operating unsatisfactorily. Accordingly, the destination host(s) 612 may remove the virtualized resource from the slot, retrieve the previous virtualized resource data 704 from the rollback storage 148, and relaunch the previous virtualized resource in the slot in order to resume operations of the edge location.

In various implementations, the signaling 700 illustrated in FIG. 7 enables the previous virtualized resource to be relaunched if the updated virtualized resource is unable to be transferred to the edge location or is operating unsatisfactorily after it is transferred to the edge location.

Figure 8:
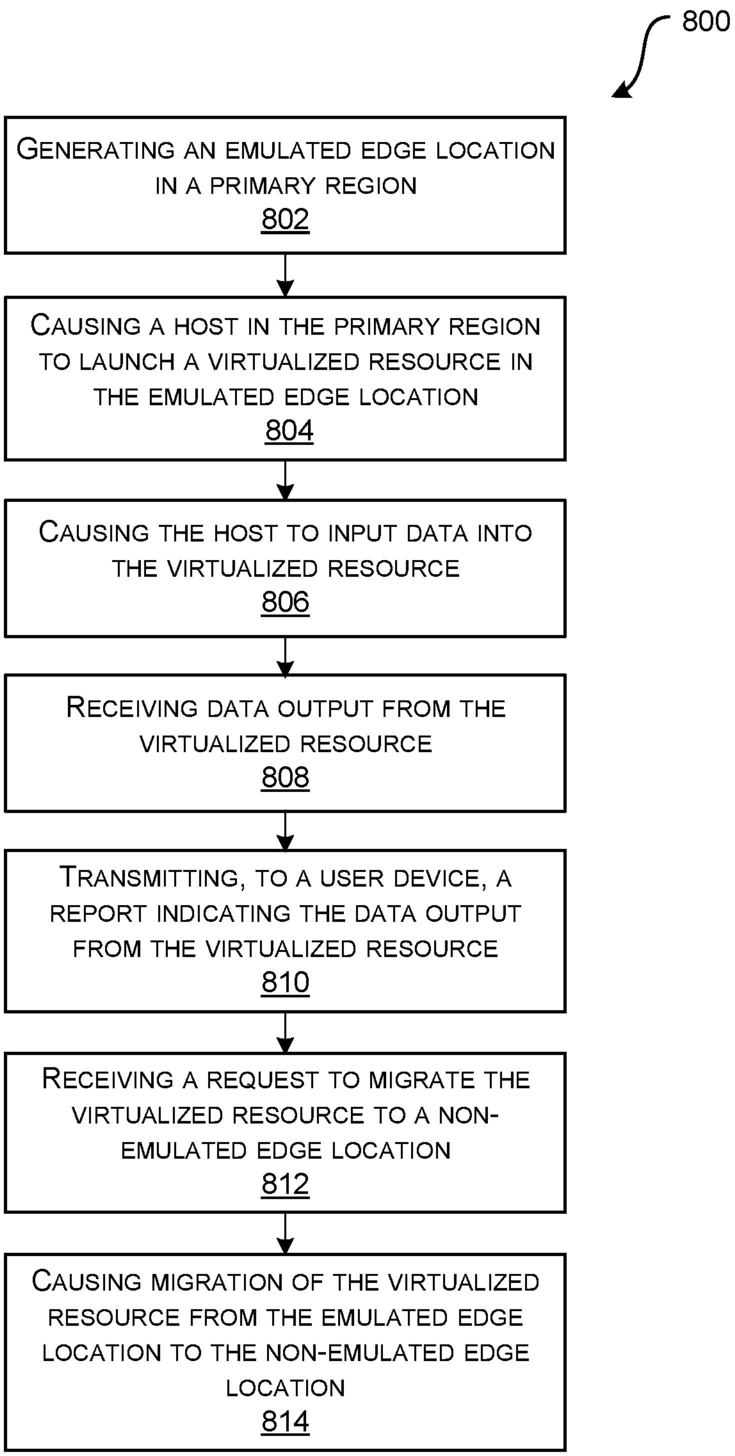
FIG. 8 illustrates an example process for testing a virtualized resource in an emulated edge location and migrating the virtualized resource to a non-emulated edge location.

FIG. 8 illustrates an example process 800 for testing a virtualized resource in an emulated edge location and migrating the virtualized resource to a non-emulated edge location. In various implementations, the process 800 may be performed by an entity including at least one of the primary hosts 108, the emulation engine 142, or the network orchestrator 144, which were described above with reference to FIG. 1.

At 802, the entity may generate an emulated edge location in a region. The region may include at least one data center in an availability zone of a cloud-provider network. In some cases, various characteristics (e.g., network configuration, communication protocols, nodes, interfaces, or the like) may be specified by a user.

In various implementations, the emulated edge location may be based on a non-emulated region outside of the region. The non-emulated edge location may be connected to the region by a secure tunnel. The secure tunnel, in various implementations, may traverse at least one public network, such as the Internet. In various examples, the non-emulated edge location may include at least one data center.

In various examples, the non-emulated edge location may include various physical and/or virtual nodes interconnected by various physical and/or virtual interfaces according to a particular network configuration. The entity may generate the emulated edge location to include various virtual nodes based on the physical and/or virtual nodes of the non-emulated edge location. For example, the entity may generate various VMs in the emulated edge location that perform the same operations as various VMs and/or physical machines in the non-emulated edge location. The entity may generate the emulated edge location to include various virtual interfaces based on the physical and/or virtual interfaces of the non-emulated edge location. For example, the entity may generate various virtual interfaces in the emulated edge location that enforce the same latencies, utilize the same communication protocols, or the like, as the physical and/or virtual interfaces in the non-emulated edge location. The entity may generate the emulated edge location to have the same or similar network configuration as the non-emulated edge location.

Each one of the data centers in the region and the non-emulated edge location may include various hosts that include various computing resources. At least a portion of the computing resources in the region may be allocated to the emulated edge location. For example, the entity may generate a VPC among the computing resources of the region. The VPC may have a particular subnet, which may be modeled after a subnet of the non-emulated edge location, in some cases.

At 804, the entity may cause a host in the region to launch a virtualized resource in the emulated edge location. The virtualized resource may be, for example, a VM, a software instance, or the like. In some cases, the virtualized resource may be built within the emulated edge location according to specifications and/or modifications input by a user. For example, a user input may specify data associated with the virtualized resource, such as any combination of state data of the virtualized resource, data encoding instructions for operations of the virtualized resource, data stored in a block storage volume associated with the virtualized resource, local storage of the virtualized resource, or the like. The user input may further specify interfaces connecting the virtualized resource to any other nodes within the emulated edge network.

In some examples, the virtualized resource may be copied from an existing virtualized resource in the non-emulated region and migrated from the non-emulated region. For example, a request to generate the virtualized resource by copying the existing virtualized resource may be transmitted to a host in which the existing virtualized resource occupies. A request to migrate the copied virtualized resource may be transmitted to the host. As a result, the host may transfer the copied virtualized resource to the emulated edge location. The host may further provide a message confirming that the copied virtualized resource has been successfully migrated.

In various examples, the virtualized resource may be modified according to input from a user. For example, the user input may specify a modification to any combination of the state data of the virtualized resource, the data encoding instructions for operations of the virtualized resource, the data stored in a block storage volume associated with the virtualized resource, the local storage of the virtualized resource, or the like. The modification may be carried out by the entity and/or any host in which the virtualized resource occupies.

At 806, the entity may cause the host to input data into the virtualized resource. The input data may be received from at least one host in the non-emulated edge location. For example, the input data may correspond to data input into a corresponding virtualized resource within the non-emulated edge location during operation of the non-emulated edge location. In some cases, the input data may be received from a user.

At 808, the entity may receive data output from the virtualized resource. In various implementations, the host may copy, mirror, intercept, and/or otherwise provide the output data.

At 810, the entity may transmit a report to a user device, which may indicate the data output from the virtualized resource. For example, the report may include the output data. In some cases, the entity may compare the output data to expected output data for the virtualized resource. The expected output data may be prespecified by a user and/or gathered from data transmitted through the non-emulated edge location. In some cases, the report can indicate a comparison between the output data and the expected output data. In some cases, the entity may identify a capacity of the region utilized by the emulated edge location. The entity may generate the report to indicate a predetermined edge location type that includes the capacity. The edge location type may include a number of physical hosts in the edge location, a type (e.g., make and/or model) of physical hosts in the edge location, a capacity of the edge location, a type of software (e.g., an operating system, firmware, a program, etc.) running in the edge location, a communication protocol of the edge location, or the like. Accordingly, the non-emulated edge location can be selected (e.g., by the user) to be of the predetermined edge location type and ordered prior to deployment of the non-emulated edge location.

At 812, the entity may receive a request to migrate the virtualized resource to a non-emulated edge location. In some cases, the request may be received from a user device. The request may be initiated by a user.

At 814, the entity may cause migration of the virtualized resource from the emulated edge location to the non-emulated edge location. In various examples, a request to migrate the virtualized resource may be transmitted to at least one first host in the region including first computing resources in which the virtualized resource occupies. The request may be to migrate the virtualized resource to at least one second host including at least one second computing resource in the non-emulated edge location. In response to receiving the request, the first host(s) may transfer data associated with the virtualized resource to the second host(s). In some cases, the second host(s) may provide a message confirming that the virtualized resource has been successfully migrated to the second host(s).

In some cases, the entity may cause the second host(s) to prepare a slot for the virtualized resource in advance of the transfer of the data associated with the virtualized resource. For example, the entity may transmit a request to prepare the slot to the second host(s). In turn, the second host(s) may clear out the second slot for the virtualized resource.

Figure 9:
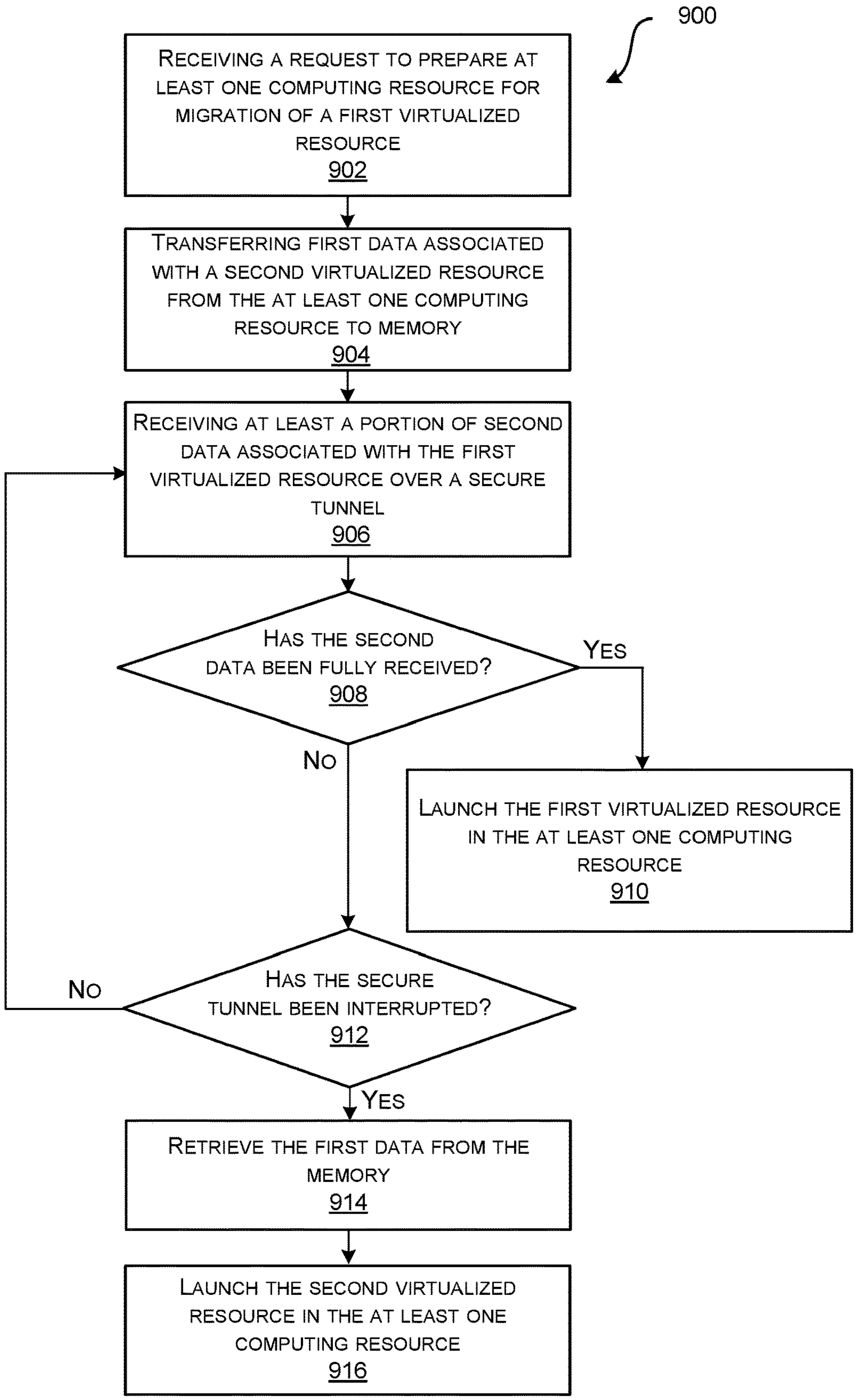
FIG. 9 illustrates an example process for migrating a first virtualized resource into a non-emulated edge location and rolling back the migration if the first virtualized resource is unsuccessfully migrated.

FIG. 9 illustrates an example process 900 for migrating a first virtualized resource into a non-emulated edge location and rolling back the migration if the first virtualized resource is unsuccessfully migrated. In various implementations, the process 900 can be performed by an entity including at least one of the edge hosts 110, the edge orchestrator 146, or the rollback storage 148 described above with reference to FIG. 1.

At 902, the entity may receive a request to prepare at least one computing resource for migration of a first virtualized resource to at least one computing resource. For example, the request may be to clear a slot in the computing resource(s) for the first virtualized resource. In various examples, the computing resource(s) may be part of a non-emulated edge location. The non-emulated edge location may be connected to a region by a secure tunnel that traverses at least one public network, such as the Internet. The region may include one or more data centers in an availability zone of a cloud-provider network.

At 904, the entity may transfer first data associated with a second virtualized resource from the at least one computing resource to memory. The first data may include any combination of state data of the second virtualized resource, data encoding instructions for operations of the second virtualized resource, data stored in a block storage volume associated with the second virtualized resource, local storage of the second virtualized resource, or the like. In some examples, the first virtualized resource may be an updated version of the second virtualized resource.

At 906, the entity may receive at least a portion of second data associated with the first virtualized resource over the secure tunnel. The second data may include any combination of state data of the first virtualized resource, data encoding instructions for operations of the first virtualized resource, data stored in a block storage volume associated with the first virtualized resource, local storage of the first virtualized resource, or the like.

At 908, the entity may determine whether the second data has been fully received. If the entity determines that the second data has been fully received at 908, the entity may launch the first virtualized resource in the at least one computing resource at 910. For example, the launch the first virtualized resource in the prepared slot. In various implementations, the entity may reattach at least one virtual interface from the second virtualized resource to the first virtualized resource.

If the entity determines that the second data has not been fully received at 908, the entity may determine whether the secure tunnel has been interrupted at 912. For example, the entity may determine whether any expected communication from the region has been timed out.

If the entity determines that the secure tunnel has not been interrupted at 912, the process 900 may return to 906. On the other hand, if the entity determines that the secure tunnel has been interrupted at 912, the process 900 may proceed to 914. At 914, the entity may retrieve the first data from the memory. For example, the entity may delete any of the second data in the slot and transfer the first data from the memory to the slot and/or computing resource(s).

At 916, the entity may launch the second virtualized resource in the at least one computing resource. For example, the entity may launch the second virtualized resource in the slot. Accordingly, the entity may ensure that operations of the non-emulated edge location may continue, even if the attempted migration of the first virtualized resource is interrupted.

Figure 10:
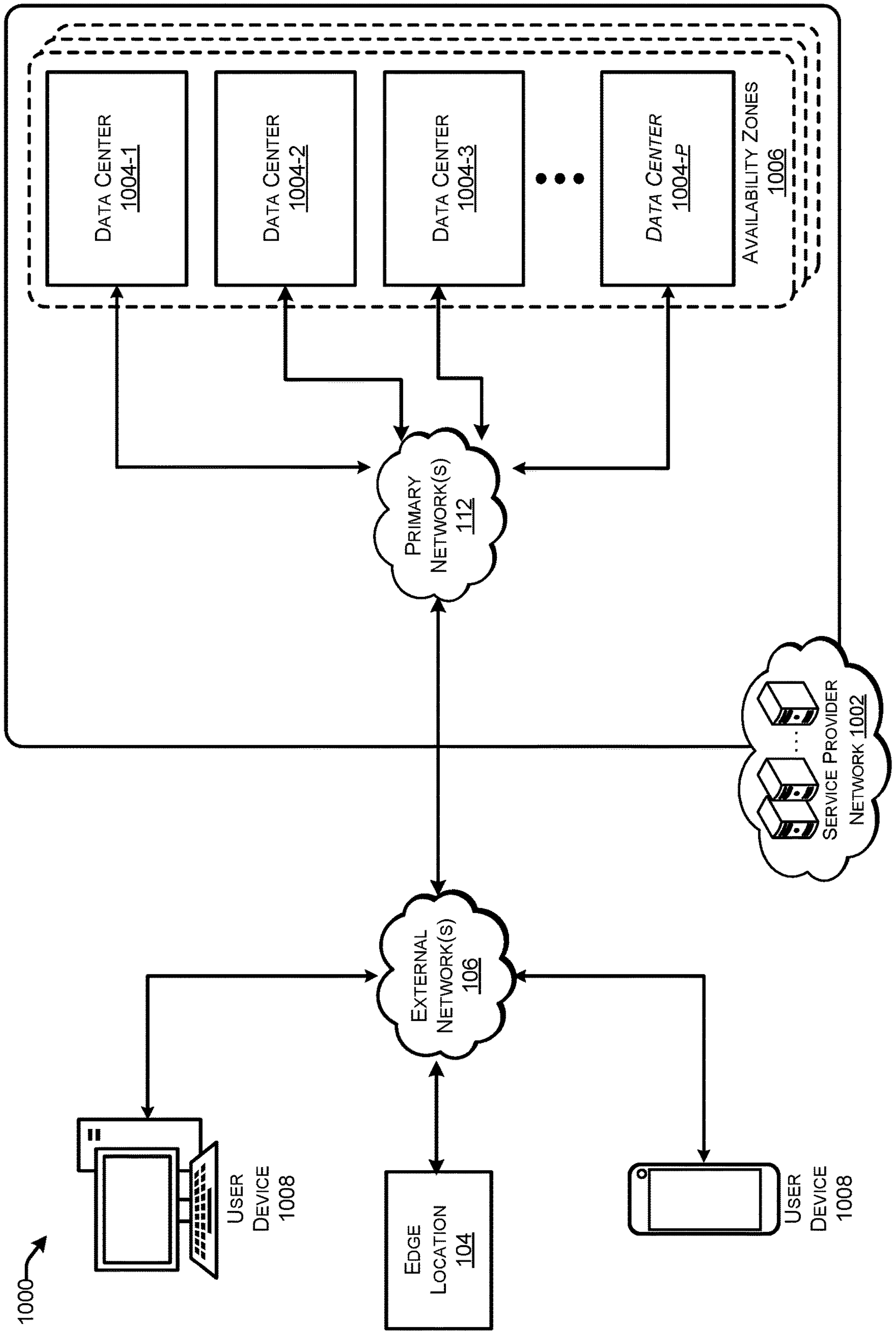
FIG. 10 is a system and network diagram showing an illustrative operating environment that includes a service provider network, which can be configured to implement aspects of various functionalities described herein.

FIG. 10 is a system and network diagram showing an illustrative operating environment 1000 that includes a service provider network 1002, which can be configured to implement aspects of various functionalities described herein. The service provider network 1002 can provide computing resources, like Virtual Machine (VM) instances and storage, on a permanent or an as-needed basis.

Among other types of functionality, the computing resources provided by the service provider network 1002 may be utilized to implement various services described above. For instance, the computing resources provided by the service provider network 1002 can include various types of computing resources, such as data processing resources like VM instances, data storage resources, networking resources, data communication resources, network services, and the like. In some cases, the computing resources are provided via servers within the service provider network 1002.

Each type of computing resource provided by the service provider network 1002 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, and/or other types of programs. Data storage resources can include file storage devices, block storage devices, and the like. The service provider network 1002 can also be configured to provide other types of computing resources not mentioned specifically herein.

The computing resources provided by the service provider network 1002 may be enabled in some implementations by one or more data centers 1004-1 to **1004-*p*, wherein p is a positive integer. The data center(s) 1004-1 to 1004-*p* might be referred to herein singularly as "a data center 1004" or in the plural as "the data centers 1004"). The data centers 1004 are facilities utilized to house and operate computer systems and associated components. The data centers 1004 can include redundant and backup power, communications, cooling, and security systems. The data centers 1004 can also be located in geographically disparate locations, or regions. One region may include multiple availability zones 1006. A region can be defined as a geographical area in which the cloud provider network 1002 clusters data centers 1004. Each region can include two or more availability zones 806 connected to one another via a private high-speed network, for example a fiber communication connection. An availability zone can refer to an isolated failure domain including one or more data center facilities with separate power, separate networking, and separate cooling from those in another availability zone. In some cases, availability zones 1006 within a region may be positioned far enough away from one other that the same natural disaster should not take more than one availability zone 1006 offline at the same time. One illustrative embodiment for a data center 1004 that can be utilized to implement the technologies disclosed herein will be described below with regard to FIG. 11**.

Various user devices 1008 that utilize the service provider network 1002 may access the computing resources provided by the service provider network 1002 over the external network(s) 106, which may include any wired and/or network(s). The external network(s) 106 may include a Wide Area Network (WAN), such as the Internet, an intranet or an Internet Service Provider (ISP) network or a combination of such networks. In some cases, the external network(s) 106 may include a cloud-based network. In some examples, without limitation, a user device 1008 operated by a client of the service provider network 1002 may be utilized to access the service provider network 1002 by way of the external network(s) 106. It should be appreciated that a Local Area Network (LAN), the Internet, or any other networking topology known in the art that connects the data centers 1004 to remote clients and other users can be utilized. It should also be appreciated that combinations of such networks can also be utilized.

In particular implementations, the user device 1008 may utilize resources of a host in a first data center 1004-1 among the data centers 1004 via a virtualized resource hosted on the host. The network orchestrator 144 may cause computing resources within the first data center 1004-1 to be allocated to an emulated edge location. The network orchestrator 144 may cause the virtualized resource to migrate from the original host to a destination host in the edge location 104 outside of the service provider network 1002. In some cases, the network orchestrator 144 can confirm that the destination host can reserve sufficient capacity to host the virtualized resource, prior to causing migration of the virtualized resource.

In some cases, although not specifically illustrated in FIG. 10, at least a portion of the network orchestrator 144 can be hosted by one or more of the data centers 1004. For instance, the network orchestrator 144 may be hosted by one of the data centers 1004 in relatively close geographical proximity to the user device 1008. In some cases, the network orchestrator 144 may be configured to migrate multiple virtualized resources between multiple servers in the same availability zone 1006, or between servers in the edge location 104 and a particular availability zone 1006. In some cases, the network orchestrator 144 may be hosted by one of the data centers 1004 in the same availability zone 1006 as one or both of the servers.

Figure 11:
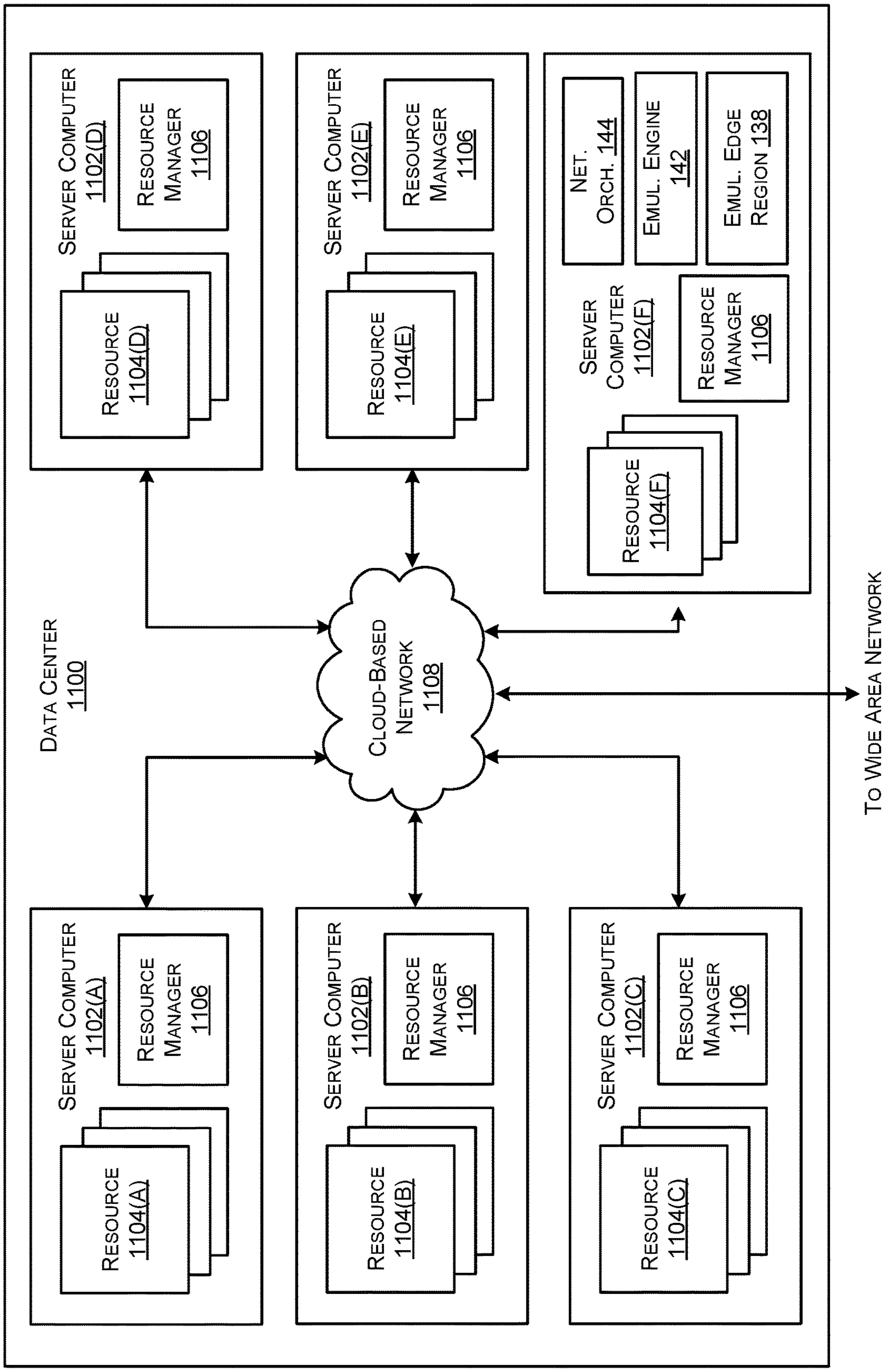
FIG. 11 is a computing system diagram illustrating a configuration for a data center that can be utilized to implement aspects of the technologies disclosed herein.

FIG. 11 is a computing system diagram illustrating a configuration for a data center 1100 that can be utilized to implement aspects of the technologies disclosed herein. The example data center 1100 shown in FIG. 11 includes several server computers 1102(A)-1102(F) (which might be referred to herein singularly as "a server computer 1102" or in the plural as "the server computers 1102") for providing computing resources 1104(A)-1104(F). In some examples, the resources 1104 and/or server computers 1102 may include, be included in, or correspond to, the computing resource network 1002 described above with reference to FIG. 10.

The server computers 1102 can be standard tower, rack-mount, or blade server computers configured appropriately for providing the computing resources described herein (illustrated in FIG. 11 as the resources 1104(A)-1104(F)). As mentioned above, the computing resources provided by the service provider network 1002 can be data processing resources such as Virtual Machine (VM) instances or hardware computing systems, database clusters, computing clusters, storage clusters, data storage resources, database resources, networking resources, and others. Server computers 1102 in the data center 1100 can also be configured to provide network services and other types of services.

The server computers 1102 (i.e., server computers 1102(A)-1102(F)) can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102.

At least one of the servers 1102 (i.e., server computer 1102(F)) may further execute a network orchestrator 144 and/or emulation engine 142, as described throughout the rest of this disclosure. In various implementations, at least one of the servers 1102 may further execute an emulated edge location 138.

In the example data center 1100 shown in FIG. 11, an appropriate network 1112 is also utilized to interconnect the server computers 1102(A)-1102(F). It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004-1 to 1004-*p* (described above with reference to FIG. 10), between each of the server computers 1102(A)-1102(F) in the data center 1100. It should be appreciated that the configuration of the data center 1100 described with reference to FIG. 11 is merely illustrative and that other implementations can be utilized.

Server computer 1102(F) can execute some or all of the software components described above. The server computer 1102(F) can also be configured to execute other components and/or to store data for providing some or all of the functionality described herein. In this regard, it should be appreciated that the services illustrated in FIG. 11 as executing on the server computer 1102(F) can execute on many other physical or virtual servers in the data centers 1004 in various embodiments.

Figure 12:
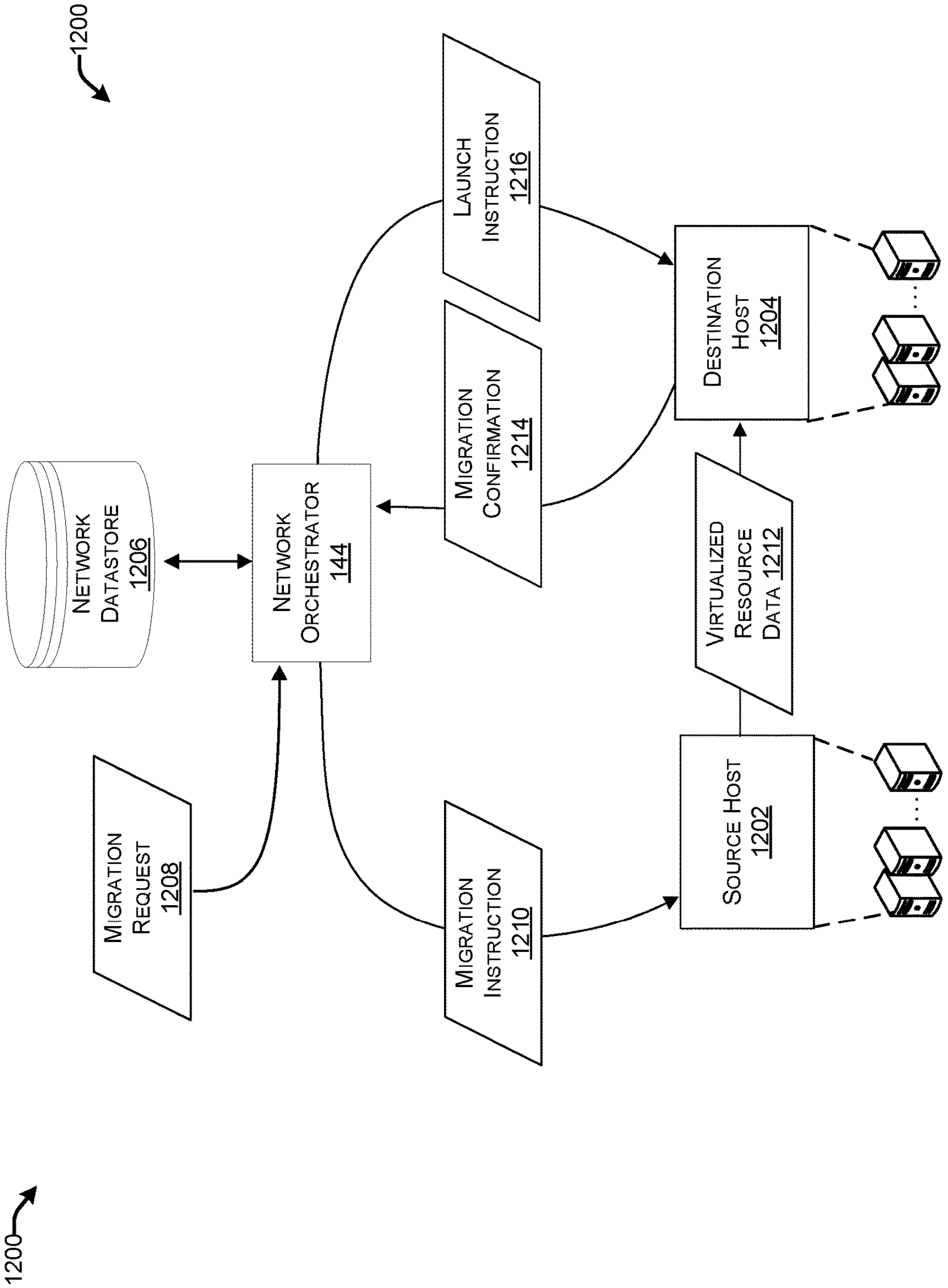
FIG. 12 illustrates example signaling for performing migration according to any of the implementations described herein.

FIG. 12 illustrates example signaling 1200 for performing migration according to any of the implementations described herein. As illustrated, the signaling 1200 may be between a source host 1202, a destination host 1204, the network orchestrator 144, and a network datastore 1206. Further, the signaling 1200 can include transmissions over one or more internal networks (e.g., the primary network(s) 112, customer network 114, and/or the emulated customer network 120 described above with reference to FIG. 1), in one or more data centers (e.g., in any of the data centers of the region 102 and/or the edge location 104 described above with reference to FIG. 1), and/or over one or more external networks (e.g., the external network(s) 106 described above with reference to FIG. 1. For example, at least some of the signaling 1200 may occur over a secure tunnel, such as the tunnel 116 described above with reference to FIG. 1.

As illustrated in FIG. 12, the network orchestrator 144 may receive a migration request 1208 (e.g., the migration request 604 described above with reference to FIG. 6). The migration request 1208 may include at least one of an identifier of the source host 1202 (e.g., an IP address of the source host 1202, a host ID of the source host 1202, etc.), an identifier of the particular virtualized resource being migrated (e.g., an IP address of the particular virtualized resource, a virtualized resource ID of the particular virtualized resource, a domain ID of at least one resource occupied by the particular virtualized resource, etc.), or the like.

In some cases, the network orchestrator 144 may confirm whether the particular virtualized resource is suitable for migration. According to various implementations, the network orchestrator 144 may confirm that the particular virtualized resource is associated with less than a threshold amount of data (e.g., less than 1 MB, less than 1 GB, or some other amount of data) in local storage of the source host 1202. For instance, the network orchestrator 144 may access a datastore (e.g., stored locally or elsewhere in the data center(s) storing an entry indicating that the virtualized resource is associated with less than the threshold amount of data, the migration request 1208 itself may indicate that the virtualized resource is associated with less than the threshold amount of data, or the like.

According to some cases, the network orchestrator 144 may identify a destination of the particular virtualized resource. That is, the network orchestrator 144 may identify that the particular virtualized resource should be migrated to a particular slot in the destination host 1204. In some cases, the network orchestrator 144 may select the destination host 1204 from a list of hosts in a datastore (e.g., stored locally or elsewhere in the data center(s)) indicating that the destination host 1204 is up-to-date and/or has enough free capacity to host the particular virtualized resource. For example, the network orchestrator 144 may identify that the destination host 1204 is up-to-date by identifying at least one of an absence of available updates for the destination host 1204, a previous update of the destination host 1204 was performed after a threshold time (e.g., one day, ten days, 100 days, one year, or some other time period ago), or the like. In some cases, the network orchestrator 144 may specifically select the destination host 1204 among hosts with similar capabilities to the source host 1202, such as similar memory capacity, similar processing capacity, the same operating system, the same vendor, or the like. For instance, the destination host 1204 may have a memory capacity or processing capacity within a threshold range of a memory capacity and/or processing capacity of the source host 1202.

Upon determining to migrate the particular virtualized resource, the network orchestrator 144 may transmit a migration instruction 1210 (e.g., the migration instruction 606 described above with reference to FIG. 6) to the source host 1202. In various cases, the migration instruction 1210 may direct the source host 1202 to transfer virtualized resource data 1212 (e.g., the virtualized resource data 610 described above with reference to FIG. 6 or the virtualized resource data 706 described above with reference to FIG. 7) associated with the particular virtualized resource to the destination host 1204. In some examples, the migration instruction 1210 may include at least one of an identifier of the particular virtualized resource, an identifier of the domain and/or slot of the source host 1202 in which the particular virtualized resource occupies, an identifier of the destination host 1204 (e.g., an IP address of the destination host 1204, a host ID of the destination host 1204, or the like), an identifier of an unoccupied domain and/or slot in the destination host 1204, or the like. The source host 1202 may cease operations of the virtualized resource upon receiving the migration instruction 1210. For example, the virtualized resource may be booted down by the source host 1202.

According to some cases, the migration instruction 1210 may direct the source host 1202 to directly transfer the virtualized resource data 1212 to the destination host 1204. For example, the migration instruction 1210 may direct the source host 1202 to establish a peer-to-peer connection with the destination host 1204. In various cases, the source host 1202 may transfer the virtualized resource data 1212 to the destination host 1204 over the peer-to-peer connection.

In some implementations, the migration instruction 1210 may direct the source host 1202 to transfer the virtualized resource data 1212 to the network orchestrator 144, which may forward the virtualized resource data 1212 to the destination host 1204. That is, the network orchestrator 144 may act as a mediator of the transfer of the virtualized resource data 208 from the source host 1202 to the destination host 1204.

In various implementations, the source host 1202 may transmit the virtualized resource data 1208 to the destination host 1204. The virtualized resource data 1212 may include various data associated with the particular virtualized resource, such as any combination of state data of the virtualized resource, data encoding instructions for operations of the virtualized resource, data stored in a block storage volume associated with the virtualized resource, local storage of the virtualized resource, or the like. Upon the transfer of the virtualized resource data 1212 from the source host 1202 to the destination host 1204, the particular virtualized resource can resume operations on the destination host 1204.

In example implementations, the destination host 1204 may transmit, to the network orchestrator 144, a migration confirmation 1214 in response to determining that the virtualized resource data 1212 has been fully transferred to the destination host 1204. According to some cases, the network orchestrator 144 may perform additional functionality within the data center(s) to enable the virtualized resource to launch on the destination host 1204. For instance, the network orchestrator 144 may instruct one or more routers in the internal network(s) of the data center(s) to update routing tables, such that data destined for the virtualized resource is transmitted to the destination host 1204, rather than the updated host 104.

The network orchestrator 144 may transmit, to the destination host 1204, a launch instruction 1216. Once the destination host 1204 receives the launch instruction 1216, the virtualized resource may launch exclusively on the destination host 1204. Once the virtualized resource launches on the destination host 1204, the virtualized resource may proceed to operate on the destination host 1204. In some cases, however, the launch instruction 1216 may be omitted from the signaling 1200.

Figure 13:
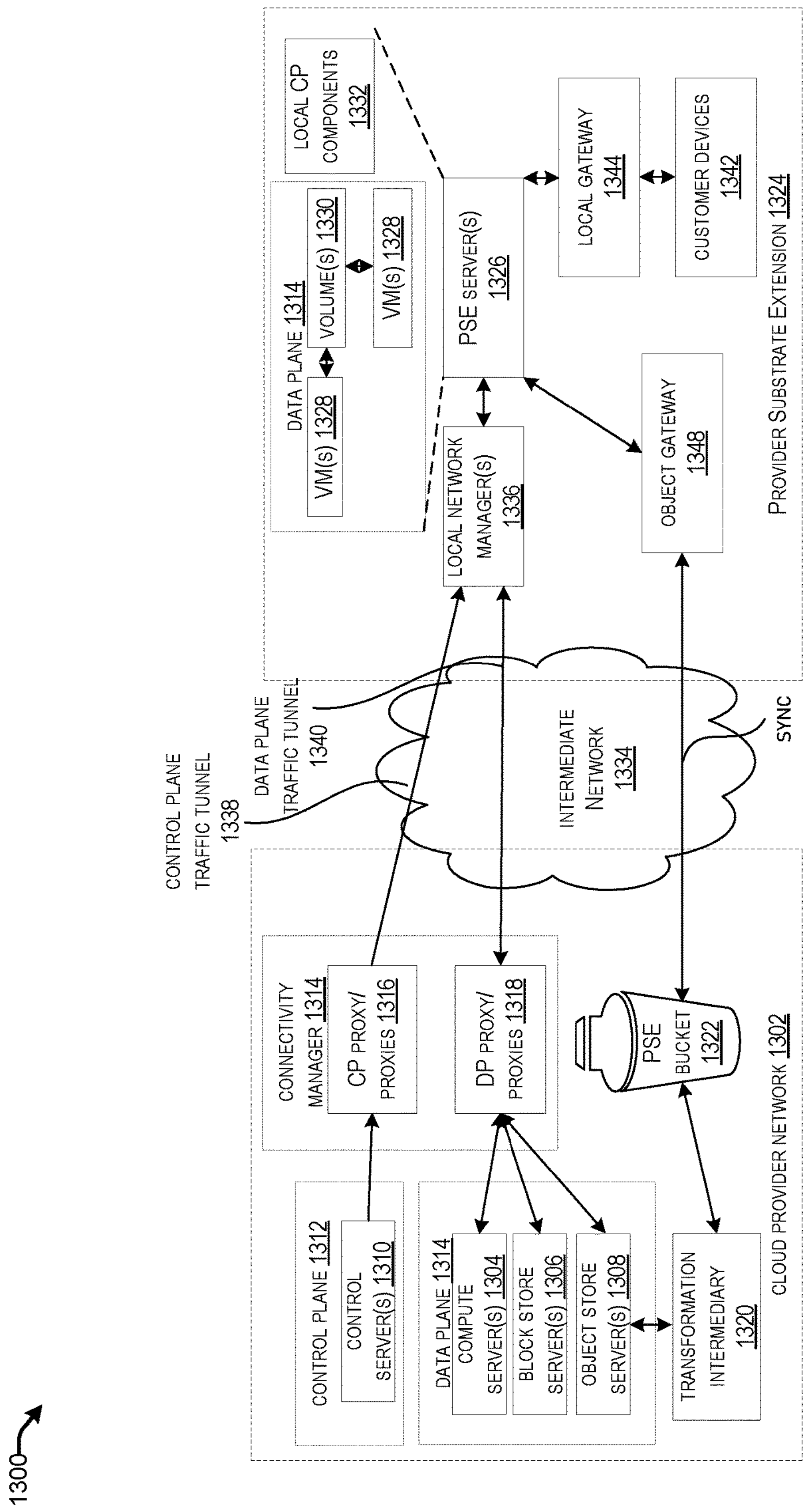
FIG. 13 illustrates an example environment of a cloud provider network and a provider substrate extension of the cloud provider network, according to some embodiments.

FIG. 13 illustrates an example environment 1300 of a cloud provider network 1302 and a provider substrate extension of the cloud provider network, according to some embodiments. A cloud provider network 1302 (sometimes referred to simply as a "cloud") refers to a pool of network-accessible computing resources (such as compute, storage, and networking resources, applications, and services), which may be virtualized or bare-metal. The cloud 1302 can provide convenient, on-demand network access to a shared pool of configurable computing resources that can be programmatically provisioned and released in response to customer (e.g., user) commands. These resources can be dynamically provisioned and reconfigured to adjust to variable load. Cloud computing can thus be considered as both the applications delivered as services over a publicly accessible network (e.g., the Internet, a cellular communication network, or the like) and the hardware and software in cloud provider data centers that provide those services.

The cloud provider network 1302 can provide on-demand, scalable computing platforms to users through a network, for example allowing users to have at their disposal scalable "virtual computing devices" (e.g., virtualized resources) via their use of the compute servers 1304 (which provide compute instances via the usage of one or both of CPUs and GPUs, optionally with local storage) and block store servers 1306 (which provide virtualized persistent block storage for designated compute instances). These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, Application Programming Interface (API), software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An API refers to an interface and/or communication protocol between a client and a server, such that if the client makes a request in a predefined format, the client should receive a response in a specific format or initiate a defined action. In the context of the cloud provider network 1302, APIs provide a gateway for customers to access cloud infrastructure by allowing customers to obtain data from or cause actions within the cloud provider network 1302, enabling the development of applications that interact with resources and services hosted in the cloud provider network. APIs can also enable different services of the cloud provider network 1302 to exchange data with one another. Users can choose to deploy their virtual computing systems to provide network-based services for their own use and/or for use by their customers or clients.

A cloud provider network can be formed as a number of regions 1302, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network). Transit Centers (TC) are the primary backbone locations linking customers to the cloud provider network 1302 and may be co-located at other network provider facilities (e.g., Internet service providers, telecommunications providers, or the like). Each region can operate at least two TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers.

The cloud provider network 1302 can include a physical network (e.g., sheet metal boxes, cables, rack hardware) referred to as the substrate. The substrate of the cloud provider network 1302 can be considered as a network fabric containing the physical hardware that runs the services of the provider network 1302, and can include networking devices such as routers, switches, network address translators (NATs), and so on, as well as the physical connections among the devices. The substrate may be isolated from the rest of the cloud provider network 1302, for example it may not be possible to route from a substrate network address to an address in a production network that runs services of the cloud provider, or to a customer network that hosts customer resources.

The cloud provider network 1302 can also include an overlay network of virtualized computing resources (e.g., compute instances, block store volumes, data objects such as snapshots and machine images, file storage, databases, or the like) that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., Virtual Private Clouds (VPCs), security groups, or the like). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 1304, a block store server 1306, an object store server 1308, a control server 1310) can have an IP address in the substrate of the cloud provider network 1302. Hardware virtualization technology can enable multiple operating systems to run concurrently on a host computer, for example as VMs on a compute server. A virtual machine monitor (VMM) (e.g., a hypervisor and/or a resource manager), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 1302. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network 1302 for routing packets between endpoints.

As illustrated, the traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 1312 distributed across and implemented by one or more control servers 1310. Control plane traffic generally includes administrative operations, such as establishing isolated virtual networks for various customers, monitoring resource usage and health, identifying a particular host or server at which a requested compute instance is to be launched, provisioning additional hardware as needed, and so on. Data plane components 1314 include customer resources (e.g., computing instances, containers, block storage volumes, databases, file storage, or the like) that are implemented on physical resources (e.g., the compute server(s) 1304, the block store server(s) 1306, the object store server(s) 1308, or the like) of the provider network. Data plane traffic generally includes non-administrative operations such as transferring data to and from the customer resources.

The control plane components 1312 can be implemented on a separate set of servers (e.g., the control server(s) 1310) from the data plane servers (e.g., the compute server(s) 1304, the block store server(s) 1306, and the object store server(s) 1308), and control plane traffic and data plane traffic may be sent over separate/distinct networks. In some embodiments, control plane traffic and data plane traffic can be supported by different protocols. In some embodiments, messages (e.g., packets) sent over the provider network 1302 include a flag (e.g., in a packet header) to indicate whether the traffic is control plane traffic or data plane traffic. In some embodiments, a payload of a message may be inspected to determine the message's type (e.g., whether the message is a control plane message or a data plane message). Other techniques for distinguishing traffic types are possible.

As illustrated in FIG. 13, the data plane components 1314 can include the compute server(s) 1304, which may be bare metal (e.g., single tenant) or may be virtualized by a hypervisor to run multiple VMs (sometimes referred to as "instances") for one or more customers. These compute servers 1304 can support a virtualized computing service (also known as an elastic compute service, a virtual machines service, a computing cloud service, a compute engine, or cloud compute) of the provider network. The provider may offer virtual compute instances (e.g., virtualized resources) with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane components 1312 can also include one or more block store servers 1306, which can include persistent storage for storing volumes of customer data as well as software for managing these volumes. These block store servers 1306 can support a managed block storage service of the provider network 1302. The block store servers 1306 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from one GB to one terabyte TB (or more) in size, are made of one or more blocks stored on the block store servers 1306. Although treated as an individual hard drive, it will be appreciated that a volume may be stored as one or more virtualized devices implemented on one or more underlying physical host devices. Volumes may be partitioned a small number of times (e.g., up to 13) with each partition hosted by a different host. The data of the volume may be replicated between multiple devices within the provider network 1302, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "access operations," "input output operations," or "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane components 1314 can also include one or more object store servers 1308, which represent another type of storage within the cloud provider network 1302. The object storage servers 1308 include one or more servers on which data is stored as objects within resources referred to as buckets, and can be used to support a managed object storage service of the cloud provider network 1302. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers 1308 distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

The cloud provider network 1302 may also include a connectivity manager 1316, which may include at least one control plane proxy 1316 and at least one data plane proxy 1318. The cloud provider network 1302 may also include a transformation intermediary 1320 associated with a Provider Substrate Extension (PSE) bucket 1322. The proxies 1314 and 1316, transformation intermediary 1320, and PSE bucket 1322 depicted in the cloud provider network 1302 may be provisioned in a particular region or availability zone of the cloud provider network 1302 in response to the creation of a substrate extension, and are described in further detail below.

Some customers may desire to use the resources and services of the cloud provider network 1302, but for various reasons (e.g., latency in communications with customer devices, legal compliance, security, or other reasons) prefer for these resources and services to be provisioned within their own network, for example on premises of the customer. The technology described herein enables a piece of the cloud provider network—referred to herein as an “edge location,” “edge location(s),” “provider substrate extension,” or PSE 1324—to be provisioned within the customer's network. A customer may access their PSE 1324 via the cloud provider substrate 1302 or their own network, and may use the same APIs to create and manage resources in the PSE 1324 as they would use to create and manage resources in the region.

The PSE 1324 may be pre-configured, e.g. by the provider network operator, with the appropriate combination of hardware with software and/or firmware elements to support various types of computing-related resources, and to do so in a manner that mirrors the experience of using the provider network 1302. For example, one or more PSE servers 1326 can be provisioned by the cloud provider within the customer network. As described above, the provider network 1302 may offer a set of predefined instance types, each having varying types and quantities of underlying hardware resources. Each instance type may also be offered in various sizes. In order to enable customers to continue using the same instance types and sizes in their PSE 1324 as they do in the region, any of the PSE servers 1326 can be heterogeneous servers. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server 1326, meaning while other VMs are still running and consuming other capacity of the PSE server 1326. This can improve utilization of resources within the PSE 1324 by allowing for better packing of running instances on physical hosts, and also provides a seamless experience regarding instance usage across the region and PSE 1324.

As illustrated, the PSE servers 1326 can host one or more VMs 1328. The customer can use these VMs 1328 to host containers, which package up code and all its dependencies so an application can run quickly and reliably from one computing environment to another. In addition, the PSE servers 1326 may host one or more data volumes 1330, if desired by the customer. In the region, such volumes 1330 may be hosted on dedicated block store servers. However, due to the possibility of having a significantly smaller capacity in the PSE 1324 than in the region, the PSE 1324 may omit such dedicated block store servers. Accordingly, the block storage service may be virtualized in the PSE 1324, such that one of the VMs 1328 runs the block store software and stores the data of the volume. Similar to the operation of the block storage service in the region, the volumes within a PSE may be replicated for durability and availability. The volumes may be provisioned within their own VPC within the PSE 1324. The VMs 1324 and any volumes collectively make up an extension of the provider network data plane 1314 within the PSE 1324.

The PSE servers 1326 may, in some implementations, host certain local control plane components 1332, for example components that enable the PSE 1324 to continue functioning if there is a break in the connection back to the region 1302. Examples of these control plane components 1332 include a migration manager that can move the VMs 1328 between the PSE servers 1326 if needed to maintain availability, a key value data store that indicates where volume replicas are located, and a local VM placement component that can respond to requests for new VMs made via the customer network. However, generally the control plane components 1332 for the PSE 1324 will remain in the region, in order to allow the customer to use as much capacity of the PSE 1324 as possible. At least some of the VMs 1328 that are set up at the PSE 1324, and associated higher-level services that use such VMs as building blocks, may continue to function even during periods of time when connectivity to the provider network substrate network 1302, e.g., connectivity of an intermediate network 1334, is temporarily disrupted in some embodiments.

Server software may be designed by the cloud provider to run on the substrate network 1302, and this software may be enabled to run unmodified in a PSE 1324 by using one or more local network managers 1336 to create a private replica of the substrate network within the PSE (a “shadow substrate”). The local network manager(s) 1336 can run on the PSE servers 1326 and bridge the shadow substrate with the customer's on-premise network, for example by acting as a VPN endpoint between the PSE 1324 and the proxies 1316 and 1318 provisioned in the cloud provider substrate, and by implementing the mapping service (for traffic encapsulation and decapsulation) to relate data plane traffic (from the DP proxies 1318) and control plane traffic (from the CP proxies 1316) to the appropriate droplet. By implementing a local version of the provider network's substrate-overlay mapping service, resources in the PSE 1324 can seamlessly communicate with resources in the cloud provider substrate network 1302. In multi-rack PSEs 1324, inter-rack communications can go through the local network managers 1336, with local network managers 1336 maintaining open tunnels to one another. The local network managers 1336 may be collocated on the PSE servers 1326, may run on separate cards of the PSE server 1326 (e.g., an offload card), or can be installed as their own servers separate from the compute hosts. In some implementations, a single local network manager 1336 can perform these actions for all hosts in the PSE 1324. In other implementations, each host in the PSE 1324 may have a dedicated local network manager 1336.

PSEs 1324 can require secure networking tunnels 1338 and 1340 from the customer network to the cloud provider substrate 1302 in order to operate, for example to maintain security of customer data when traversing the intermediate network 1334, which may be the Internet. These tunnels 1338 and 1340 are composed of virtual infrastructure components including VPCs, CP proxies and DP proxies (which may be implemented as containers running on compute instances), and substrate network interfaces. Every host in the PSE 1324 can require at least two tunnels, one control plane traffic tunnel 1338 for CoAP control plane traffic and one data plane traffic tunnel 1340 for encapsulated data plane traffic. The connectivity manager 1314 manages the cloud provider region-side lifecycle of these tunnels 1324 and 1338 and their components, for example provisioning them automatically when needed and maintaining them in a healthy operating state.

Each CP proxy 1316 can be provisioned in the cloud provider network 1302 to represent particular host(s) in the PSE 1324. The CP proxy 1316 is an intermediary between the substrate in the cloud provider network 1302 and the shadow substrate in the PSE 1324. The CP proxy 1316 maintains a VPN tunnel to the local network manager 1336 in the PSE 1324. CP proxies 1316 can be implemented as compute instances that have a network interface in the substrate and an additional network interface in a VPC. CP proxies 1316 can implement VPN tunnels (e.g., control plane traffic tunnel 1338) back to the cloud provider region, instance traffic NATing to/from customer networks, and participates in the CoAP proxy path. CP proxies 1316 provide infrastructure for tunneling management API traffic destined for PSE hosts out of the region substrate and to the remote location of the PSE 1324. The software implemented within the CP proxies 1316 ensures that only well-formed API traffic leaves from and returns to the substrate. CP proxies 1316 provide a mechanism to expose remote devices (within the PSE 1324 in a customer facility) on the cloud provider substrate 1302, while still protecting substrate security materials (e.g., Geographic Information System (GIS) keys, Global Trading System (GTS) tokens) from leaving datacenters of the cloud provider network 1302. The one-way control plane traffic tunnel 1338 imposed by the CP proxies 1316 also importantly prevents any (potentially compromised) devices from making calls back to the substrate of the cloud provider network 1302. CP proxies 1316 may be instantiated one-for-one with the PSE servers 1326, or may be able to manage control plane traffic for multiple PSE servers 1326 in the same PSE 1324.

Each DP proxy 1318 can also be provisioned in the cloud provider network 1302 to represent particular host(s) in the PSE 1324. The DP proxy 1318 acts as a shadow or anchor of the host, and can be used by services within the cloud provider network 602 to monitor health of the host (including its availability, used/free compute and capacity, used/free storage and capacity, and network bandwidth usage/availability). The DP proxy 1318 also allows VPCs to span the PSE 1324 and a public region of the cloud provider network 1302, by acting as a proxy for at least one of the PSE server(s) 1326 in the region. Each DP proxy 1318 can be implemented as a packet-forwarding compute instance or container. As illustrated, each DP proxy 1318 can maintain a data plane traffic tunnel 1340 (e.g., a VPN tunnel) with the local network manager 1336 that manages the PSE server 1326 that the DP proxy 1318 represents. This tunnel 1340 can be used to send data plane traffic between the PSE 1324 and the region of the cloud provider network 1302. Data plane traffic flowing between the PSE 1324 and the substrate of the cloud provider network 1302 can be passed through DP proxies 1318 associated with that PSE 1324. For data plane traffic flowing from the PSE 1324 to the substrate of the cloud provider network 1302, DP proxies 1318 can receive encapsulated data plane traffic, validate it for correctness, and allow it to enter into the substrate of the cloud provider network 1302. DP proxies 1318 can forward encapsulated traffic from the substrate of the cloud provider network 1302 directly to the PSE 1324. If a DP proxy 1318 receives any control plane traffic from the PSE 1324, it will drop the traffic so that it does not enter the substrate of the cloud provider network 1324. Regarding control plane traffic flowing from the region of the cloud provider network 1302 to the PSE 1324, DP proxies 1318 can delegate non-encapsulated traffic (e.g., control plane traffic) to the appropriate CP proxy 1316 based on substrate IP address. Beneficially, this enforces the one-way secure tunnel between the CP proxies 1316 and the local network manager 1336 for control plane traffic, protecting the substrate of the cloud provider network 1302 against any potentially malicious control traffic flowing in from the PSE 1324, but still allowing the customer to send control signals into the PSE 1324 via the substrate of the cloud provider network 1302 (e.g., to provision VMs in the PSE 1324, create volumes in the PSE 1324, attach these VMs to these volumes, to deprovision any resources in the PSE 1324, and to configure networking for PSE resources).

In at least some embodiments, a local network manager 1336 may initiate the automated establishment of (or at least participate in the automated establishment of) secure network connectivity with the proxies 1316 and 1318 established at one or more data centers within the cloud provider network 1302. After connectivity has been established between the local network manager 1336 and the proxies 1316 and 1318 at the data center(s) of the cloud provider network 1302, the customer may issue commands to instantiate the VMs 1328 (and/or perform other operations using virtual machines) that use PSE resources, in a manner analogous to the way in which such commands would be issued with respect to VMs that use only provider network resources. From the perspective of the customer, the functionality of the cloud provider network 1302 may now seamlessly be utilized using local resources within the PSE 1324 (as well as resources located in the data centers of the cloud provider network 1302, if desired). The VMs 1328 set up on a PSE server 1326 at the PSE 1324 may communicate (e.g., with the help of the network manager 1336, which may perform address translation and/or other encapsulation protocol-related processing) both with customer devices 1342 located on the customer's computing network in various embodiments, as well as with other VMs that are set up in the data centers of the cloud provider network 1302, as desired.

A local gateway 1344 can be implemented to provide network connectivity between resources running on the PSE servers 1326 and customer devices 1342 on the customer's network, in order to take advantage of the reduced latency and other benefits of having cloud provider hardware installed in the customer network. The customer can configure the local gateway by issuing API calls to an interface of the cloud provider network 1302 which results in control plane commands being sent to the PSE 1324. The customer can establish communications between instances hosted by the PSE 1324 and the customer devices 1342 via the local gateway 1344. The customer devices 1342 can include any on-premise or mobile devices that have access to the customer network, for example robotic devices, manufacturing devices, medical equipment, mobile phones, or other computing devices connected to the customer network.

There may be circumstances that necessitate the transfer of data between an object storage service hosted on the object store server(s) 1308 and the PSE 124. For example, the object storage service may store machine images used to launch VMs, as well as snapshots representing point-in-time backups of volumes. An object gateway 1348 can be provider on a PSE server 1326 or a specialized storage device, and provides customers with configurable, per-bucket caching of object storage bucket contents in their PSE to minimize the impact of PSE-region latency on the customer's workloads. The object gateway 1348 can also temporarily store snapshot data from snapshots of volumes in the PSE 1324 and then sync with the object store servers 1308 in the region of the cloud provider network 1302 when possible. The object gateway 1348 can also store machine images that the customer designates for use within the PSE 1324 or on the customer's premises. In some implementations, the data within the PSE 1324 may be encrypted and/or encoded with a unique key, and the cloud provider can limit keys from being shared from the region to the PSE 1324 for security reasons. Accordingly, data exchanged between the object store servers 1308 and the object gateway 1348 may require encoding, decoding, encryption, decryption, and/or reencryption in order to preserve security boundaries with respect to encryption keys. The transformation intermediary can perform these operations, and a PSE bucket 1322 can be created (on the object store servers 1308) to store snapshot and machine image data using the PSE encryption key.

In the manner described above, the PSE 1324 forms an edge location, in that it provides the resources and services of the cloud provider network 1302 outside of a traditional cloud provider data center and geographically closer to the customer devices 1342. An edge location, as referred to herein, can be structured in several ways. In some implementations, an edge location can be an extension of the substrate of the cloud provider network 1302 including a limited quantity of capacity provided outside of an availability zone (e.g., in an edge location or other facility of the cloud provider that is located close to a customer workload and that may be distant from any availability zones). Such edge locations may be referred to as "local zones" (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more.

In some implementations, an edge location may be an extension of the substrate of the cloud provider network 1302 formed by one or more servers located on-premise in a customer or partner facility, wherein such server(s) communicate over the intermediate network 1334 (e.g., a secure channel (such as a VPN) over a publicly-accessible network such as the Internet, or in some cases a direct private connection (such as a fiber network connection)) with a nearby availability zone or region of the cloud provider network 1302. This type of substrate extension located outside of cloud provider network 1302 data centers can be referred to as an "outpost" of the cloud provider network 1302. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone (e.g., the control plane 1312 of the cloud provider network 1302). As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud-provider network, close to customer devices and/or workloads.

Figure 14:
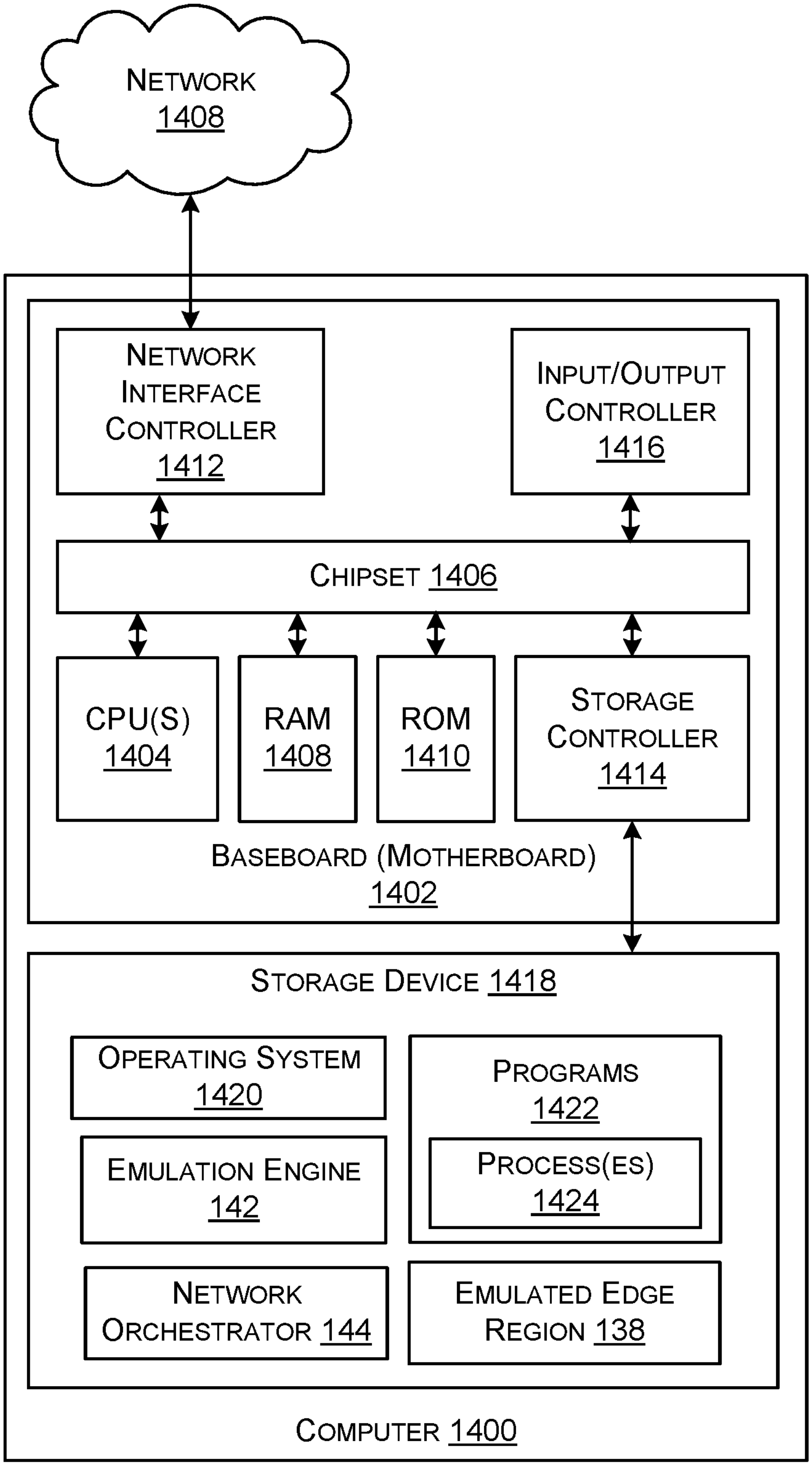
FIG. 14 is a computer architecture diagram showing an illustrative computer hardware architecture for implementing a computing device that can be utilized to implement aspects of the various technologies presented herein.

FIG. 14 is a computer architecture diagram showing an illustrative computer hardware architecture for implementing a computing device that can be utilized to implement aspects of the various technologies presented herein. The computer architecture shown in FIG. 14 illustrates a conventional server computer, workstation, desktop computer, laptop, tablet, network appliance, e-reader, smartphone, or other computing device, and can be utilized to execute any of the software components presented herein.

The computer 1400 includes a baseboard 1402, or "motherboard," which is a printed circuit board to which a multitude of components or devices can be connected by way of a system bus or other electrical communication paths. In one illustrative configuration, one or more Central Processing Units (CPUs) 1404 operate in conjunction with a chipset 1406. The CPUs 1404 can be standard programmable processors that perform arithmetic and logical operations necessary for the operation of the computer 1400.

The CPUs 1404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1406 provides an interface between the CPUs 1404 and the remainder of the components and devices on the baseboard 1402. The chipset 1406 can provide an interface to Random Access Memory (RAM) 1408, used as the main memory in the computer 1400. The chipset 1406 can further provide an interface to a computer-readable storage medium such as a Read-Only Memory (ROM) 1410 or Non-Volatile RAM ("NVRAM") for storing basic routines that help to startup the computer 1000 and to transfer information between the various components and devices. The ROM 1410 or NVRAM can also store other software components necessary for the operation of the computer 1400 in accordance with the configurations described herein.

The computer 1400 can operate in a networked environment using logical connections to remote computing devices and computer systems through a network 1408. In various implementations, the network 1408 can include at least one of a cloud-based network, a Local Area Network (LAN), or a Wide Area Network (WAN). The chipset 1406 can include functionality for providing network connectivity through a Network Interface Controller (NIC) 1412, such as a gigabit Ethernet adapter. The NIC 1412 may be capable of connecting the computer 1400 to other computing devices over the network 1014. It should be appreciated that multiple NICs 1412 can be present in the computer 1400, connecting the computer 1400 to other types of networks and remote computer systems.

The computer 1400 can also include one or more input/output controllers 1416 for receiving and processing input from a number of input devices, such as a keyboard, a mouse, a touchpad, a touch screen, an electronic stylus, or other type of input device. Similarly, an input/output controller 1416 can provide output to a display, such as a computer monitor, a flat-panel display, a digital projector, a printer, or other type of output device.

The computer 1400 can include and/or be connected to a mass storage device 1418 that provides non-volatile storage for the computer. The mass storage device 1418 can store an operating system 1420, programs 1422 (e.g., processes 1424), as well as the emulated edge location 138, the emulation engine 142, the network orchestrator 144, datastore(s) 118, and data (e.g., data associated with a virtualized resource), which have been described in greater detail herein. The mass storage device 1418 can be connected to the computer 1400 through a storage controller 1414 connected to the chipset 1406. The mass storage device 1418 can consist of one or more physical storage units. The storage controller 1414 can interface with the physical storage units through a Serial Attached SCSI (SAS) interface, a Serial Advanced Technology Attachment (SATA) interface, a Fiber Channel (FC) interface, or other type of interface for physically connecting and transferring data between computers and physical storage units.

The computer 1400 can store data on the mass storage device 1418 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1418 is characterized as primary or secondary storage, and the like.

For example, the computer 1400 can store information to the mass storage device 1418 by issuing instructions through the storage controller 1414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1400 can further read information from the mass storage device 1418 by detecting the physical states or characteristics of one or more particular locations within the physical storage units.

In addition to the mass storage device 1418 described above, the computer 1400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1400. In some examples, the operations performed by the service provider network 1002 described above with reference to FIG. 10, or any edge locations described herein, and or any components included therein, may be supported by one or more devices similar to computer 1400. Stated otherwise, some or all of the operations performed by the service provider network 1002, and or any components included therein, may be performed by one or more computer devices 1400 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, Erasable Programmable ROM (EPROM), Electrically-Erasable Programmable ROM (EEPROM), flash memory or other solid-state memory technology, Compact Disc ROM (CD-ROM), Digital Versatile Disk (DVD), High Definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1418 can store an operating system 1420 utilized to control the operation of the computer 1400. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1418 can store other system or application programs and data utilized by the computer 1400.

In one embodiment, the mass storage device 1418 or other computer-readable storage media is encoded with computer-executable instructions which, when loaded into the computer 1400, transform the computer from a general-purpose computing system into a special-purpose computer capable of implementing the embodiments described herein. These computer-executable instructions transform the computer 1400 by specifying how the CPUs 1404 transition between states, as described above. According to one embodiment, the computer 1400 has access to computer-readable storage media storing computer-executable instructions which, when executed by the computer 1400, perform the various processes described above with regard to FIGS. 1 to 13. The computer 1400 can also include computer-readable storage media having instructions stored thereupon for performing any of the other computer-implemented operations described herein.

It will be appreciated that the computer 1400 might not include all of the components shown in FIG. 14, can include other components that are not explicitly shown in FIG. 14, or might utilize an architecture completely different than that shown in FIG. 14.

Further, in some implementations, the computer 1400 may correspond to a server configured to host one or more virtualized resources at a time. In some cases in which the computer 1400 is a sever currently hosting a virtualized resource, data associated with the virtualized resource may be stored in the storage device 1418. Other architectures may be used to implement the described functionalities and are also intended to be within the scope of this disclosure. Furthermore, although specific distributions of responsibilities are defined above for purposes of discussion, the various functions and responsibilities might be distributed and divided in different ways, depending on circumstances.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

generating an emulated edge location in a region of a provider network, the region connected via an intermediate network to an actual edge location that is emulated by the emulated edge location, the emulated edge location comprising one or more first hosts in the region;

causing at least one of the first hosts to launch a virtualized resource;

receiving, from the at least one first host, output data that was output by the virtualized resource in response to input data; and causing migration of the virtualized resource from the at least one of the first hosts to a second host in an edge location, the edge location being geographically separate from the region.

2. The method of claim 1, wherein the edge location comprises second hosts comprising the second host, the second hosts being interconnected by at least one first interface in a particular network configuration, and wherein generating the emulated edge location comprises generating at least one second interface interconnecting the first hosts in the particular network configuration, the at least one second interface being at least one virtual interface emulated based on the at least one first interface.

3. The method of claim 2, wherein the at least one first interface comprises a gateway between the edge location and an external system that is outside the edge location and the region.

4. The method of claim 1, the virtualized resource being a first virtualized resource, wherein causing the at least one of the first hosts to launch the virtualized resource comprises:

transmitting, to the second host, a first request to generate the first virtualized resource by copying a second virtualized resource running on the second host;

transmitting, to the second host, a second request to migrate the first virtualized resource to the at least one of the first hosts; and receiving, from the at least one first host in the emulated edge location, a message confirming that the first virtualized resource has been successfully migrated to the at least one of the first hosts.

5. The method of claim 1, further comprising:

receiving, from a user device, a request to modify the virtualized resource;

causing the at least one of the first hosts to modify the virtualized resource in accordance with the request; and in response to modifying the virtualized resource, causing the at least one of the first hosts to input the input data.

6. The method of claim 1, wherein causing the migration of the virtualized resource comprises:

transmitting, to the at least one of the first hosts, a request to migrate the virtualized resource to the second host; and receiving, from the at least one second host, a message confirming that the virtualized resource has been successfully migrated to the second host.

7. The method of claim 6, the virtualized resource being a first virtualized resource and the request being a first request, wherein causing the migration of the first virtualized resource further comprises:

transmitting, to the second host, a second request to remove a second virtualized resource from the second host, and wherein the message confirming that the first virtualized resource has been migrated is received in response to transmitting the second request to remove the second virtualized resource.

8. The method of claim 1, further comprising:

receiving, from the second host in the edge location, the input data;

causing the at least one of the first hosts to input, into the virtualized resource, the input data;

receiving, from one or more of a user device or the second host, expected output data; and generating a report by comparing the output data to the expected output data.

9. The method of claim 1, further comprising:

identifying a capacity of the region utilized by the emulated edge location; and generating a report to indicate a predetermined edge location type that comprises the capacity, wherein the edge location is of the predetermined edge location type.

10. A system comprising:

at least one processor; and memory storing instructions that, when executed by the at least one processor, cause the system to perform operations comprising:

generating an emulated edge location in a region of a provider network, the region connected via an intermediate network to an actual edge location that is emulated by the emulated edge location, the emulated edge location comprising one or more first hosts in the region;

causing at least one of the first hosts to launch a virtualized resource;

receiving, from the at least one first host, output data that was output by the virtualized resource in response to input data; and causing migration of the virtualized resource from the at least one of the first hosts to a second host in an edge location, the edge location being geographically separate from the region.

11. The system of claim 10, wherein the edge location comprises second hosts comprising the second host, the second hosts being interconnected by at least one first interface in a particular network configuration, and wherein generating the emulated edge location comprises generating at least one second interface interconnecting the first hosts in the particular network configuration, the at least one second interface being at least one virtual interface emulated based on the at least one first interface.

12. The system of claim 11, wherein the at least one first interface comprises a gateway between the edge location and an external system that is outside the edge location and the region.

13. The system of claim 10, the virtualized resource being a first virtualized resource, wherein causing the at least one of the first hosts to launch the virtualized resource comprises:

transmitting, to the second host, a first request to generate the first virtualized resource by copying a second virtualized resource running on the second host;

transmitting, to the second host, a second request to migrate the first virtualized resource to the at least one of the first hosts; and receiving, from the at least one first host in the emulated edge location, a message confirming that the first virtualized resource has been successfully migrated to the at least one of the first hosts.

14. The system of claim 10, the operations further comprising:

receiving, from a user device, a request to modify the virtualized resource;

causing the at least one of the first hosts to modify the virtualized resource in accordance with the request; and in response to modifying the first virtualized resource, causing the at least one of the first hosts to input the input data.

15. The system of claim 10, wherein causing the migration of the virtualized resource comprises:

transmitting, to the at least one of the first hosts, a request to migrate the virtualized resource to the second host; and receiving, from the second host, a message confirming that the virtualized resource has been successfully migrated to the second host.

16. The system of claim 15, the virtualized resource being a first virtualized resource and the request being a first request, wherein causing the migration of the first virtualized resource further comprises:

transmitting, to the second host, a second request to remove a second virtualized resource from the second host, and wherein the message confirming that the first virtualized resource has been migrated is received in response to transmitting the second request to remove the second virtualized resource.

17. The system of claim 10, wherein the operations further comprise:

receiving, from the second host in the edge location, the input data;

causing the at least one of the first hosts to input, into the virtualized resource, the input data;

receiving, from one or more of a user device or the second host, expected output data; and generating a report by comparing the output data to the expected output data.

18. The system of claim 10, wherein the operations further comprise:

identifying a capacity of the region utilized by the emulated edge location; and generating a report to indicate a predetermined edge location type that comprises the capacity, and wherein the edge location is of the predetermined edge location type.

19. A system comprising:

at least one processor; and memory storing instructions that, when executed by the at least one processor, cause the system to perform operations comprising:

identifying a network configuration of an actual edge location that is geographically separate from a region of a cloud provider network, the actual edge location being connected to the region by an intermediate network, the actual edge location comprising first hosts that are configured to run first virtualized computing resources, the region comprising at least one data center in an availability zone of the cloud provider network, the at least one data center comprising second hosts that are configured to run second virtualized computing resources;

generating an emulated edge location in the region of the cloud provider network, the actual edge location being emulated by the emulated edge location, the emulated edge location comprising a virtual private cloud (VPC) that comprises a selected subset of the second hosts;

causing a particular host among the second hosts to launch a virtual machine (VM);

enabling a user to perform testing of an application running in the VM by:

causing the particular host to input predetermined input data into the VM by transmitting the predetermined input data to the particular host;

receiving, from the particular host, output data that was output by the VM in response to the predetermined input data;

identifying that the output data matches predetermined output data; and transmitting, to a user device, a report indicating that the application has been successfully tested; and in response to enabling the user to perform testing of the application, receiving, from the user device, a request to migrate the VM to the actual edge location;

in response to receiving the request to migrate the VM, causing migration of the VM from the particular host to a target host among the first hosts in the actual edge location.

20. The system of claim 19, the VM being a first VM, wherein the network configuration comprises an interconnectivity of the first hosts by at least one first interface in the actual edge location, the actual edge location being connected to an external system via a gateway, and wherein generating the emulated edge location comprises:

generating at least one second interface connecting the selected subset of the second hosts in the network configuration, the at least one second interface being at least one virtual interface emulated based on the at least one first interface;

causing a selected host among the second hosts to launch a second VM, the second VM being emulated based on the external system, the selected host being outside of the selected subset of the second hosts; and generating a third interface that is a virtual interface connecting the selected host and the selected subset of the second hosts, the third interface being emulated based on the gateway.

21. The system of claim 19, the VM being a first VM and the request being a first request, wherein causing the particular host to launch the first VM comprises:

selecting the particular host by identifying that the particular host has a first memory capacity that is within a threshold range of a second memory capacity of the target host;

transmitting, to the target host, a second request to generate the first VM by copying a second VM running on the target host;

transmitting, to the target host, a third request to migrate the first VM to the particular host in the emulated edge location;

receiving, from the particular host, a message confirming that the first VM has been successfully migrated to the particular host;

receiving, from the user device, a fourth request to modify the first VM; and causing the particular host to modify the first VM in accordance with the fourth request.

* * * * *